US012801502B2

(12) United States Patent
Akavaram et al.

(10) Patent No.: US 12,801,502 B2
(45) Date of Patent: Nov. 17, 2026

(54) SHARING REDUNDANT LANES BETWEEN MODULES IN A MULTIPLE MODULE CONFIGURATION

(71) Applicant: QUALCOMM Incorporated, San Diego, CA (US)

(72) Inventors: Santhosh Reddy Akavaram, Hyderabad (IN); Ravindranath Doddi, Hyderabad (IN); Sridhar Anumala, Hyderabad (IN); Chintalapati Bharath Sai Varma, Hyderabad (IN); Aryan Chauhan, Haridwar (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/888,886

(22) Filed: Sep. 18, 2024

(65) Prior Publication Data

US 2026/0079799 A1 Mar. 19, 2026

(51) Int. Cl.
*G06F 11/20* (2006.01)

(52) U.S. Cl.
CPC ................................ *G06F 11/2007* (2013.01)

(58) Field of Classification Search
CPC ............... G06F 11/221; G06F 11/2002; G06F 11/2007; G06F 3/0635; G01R 31/31717; H01L 22/22
See application file for complete search history.

(56) References Cited

U.S. PATENT DOCUMENTS 11,789,807 B1 * 10/2023 Kochavi ............. G06F 11/1004 714/15
2003/0112746 A1 6/2003 Schaller et al.
2004/0136319 A1 * 7/2004 Becker .................... H01L 22/22 257/E21.526
2008/0082878 A1 * 4/2008 Check .............. G01R 31/31855 714/724
2010/0083030 A1 4/2010 Thayer
2010/0199017 A1 * 8/2010 Hollis ................. G06F 11/1008 710/316
2011/0320881 A1 12/2011 Dodson et al.
(Continued)

OTHER PUBLICATIONS

International Search Report and Written Opinion—PCT/US2025/042567—ISA/EPO—Dec. 2, 2025.
(Continued)

*Primary Examiner* — Gabriel Chu
(74) *Attorney, Agent, or Firm* — Harrity & Harrity, LLP

(57) ABSTRACT

Various aspects of the present disclosure generally relate to integrated circuits. In some aspects, a device may include a plurality of modules. A first module of the plurality of modules may include a plurality of lanes for data and a plurality of redundant lanes. The device may detect that a number of faulty lanes for data in the first module, of the plurality of lanes for data, satisfies a threshold. The device may determine that one or more unused redundant lanes, in one or more of the first module or other modules of the plurality of modules, are available. The device may configure the one or more unused redundant lanes to be used as redundant lanes for the first module, wherein the one or more unused redundant lanes are configured to be shared between modules of the plurality of modules. Numerous other aspects are described.

20 Claims, 14 Drawing Sheets

(56) References Cited

U.S. PATENT DOCUMENTS

| | | | | |
|---|---|---|---|---|
| 2015/0193316 | A1* | 7/2015 | Dreps | G06F 11/2007 714/4.5 |
| 2022/0334932 | A1 | 10/2022 | Das Sharma et al. | |
| 2024/0027516 | A1 | 1/2024 | Chakravarty et al. | |
| 2025/0216456 | A1* | 7/2025 | Patel | G01R 31/31717 |
| 2026/0002988 | A1* | 1/2026 | Mitra | G01R 31/31717 |

OTHER PUBLICATIONS

Marinissen E.J., et al., “New Standard-under-Development for Chiplet Interconnect Test and Repair: IEEE Std P3405”, IEEE Draft WGDS, 1567206950390, IEEE-SA IMEET Central, Piscataway, NJ USA vol. 3405, Jun. 15, 2024, 10 Pages, XP068307360, p. 4 in section 2.1, first paragraph p. 2, Figure 2 and 3 p. 2, section 1.1.1 p. 2, section 1.1.3 table 2 on p. 4 p. 4, section 2.1, first paragraph.

* cited by examiner

SHARING REDUNDANT LANES BETWEEN MODULES IN A MULTIPLE MODULE CONFIGURATION

FIELD OF THE DISCLOSURE

Aspects of the present disclosure generally relate to integrated circuits and, for example, to sharing redundant lanes between modules in a multiple module configuration.

BACKGROUND

A system on chip (SoC) is an integrated circuit that integrates a plurality of electronic components. The electronic components may include a processor, memory, and/or a transceiver, which may all be integrated on a single piece of silicon. The SoC may contain digital signal processing functions. The SoC may be used for a mobile computing device, such as a smart phone or a tablet computer.

SUMMARY

In some implementations, a device includes a plurality of modules, wherein a first module of the plurality of modules includes a plurality of lanes for data and a plurality of redundant lanes; and multi-module logic configured to: detect that a number of faulty lanes for data in the first module, of the plurality of lanes for data, satisfies a threshold; determine that one or more unused redundant lanes, in one or more of the first module or other modules of the plurality of modules, are available; and configure the one or more unused redundant lanes to be used as redundant lanes for the first module, wherein the one or more unused redundant lanes are configured to be shared between modules of the plurality of modules.

In some implementations, a method includes detecting, using a multi-module logic of a device, that a number of faulty lanes for data in a first module, of a plurality of modules of the device, satisfies a threshold; determining, using the multi-module logic, that one or more unused redundant lanes, in one or more of the first module or other modules of the plurality of modules, are available; and configuring, using the multi-module logic, the one or more unused redundant lanes to be used as redundant lanes for the first module, wherein the one or more unused redundant lanes are configured to be shared between modules of the plurality of modules.

In some implementations, a non-transitory computer-readable medium storing a set of instructions includes one or more instructions that, when executed by one or more components of a device, cause the device to: detect, using a multi-module logic of the device, that a number of faulty lanes for data in a first module, of a plurality of modules of the device, satisfies a threshold; determine, using the multi-module logic, that one or more unused redundant lanes, in one or more of the first module or other modules of the plurality of modules, are available; and configure, using the multi-module logic, the one or more unused redundant lanes to be used as redundant lanes for the first module, wherein the one or more unused redundant lanes are configured to be shared between modules of the plurality of modules.

In some implementations, a method includes detecting, using a multi-module logic of a device, a faulty lane for data in a first module, of a plurality of modules of the device; and mapping, using the multi-module logic, the faulty lane for data to a redundant lane associated with the first module or a redundant lane associated with a second module of the plurality of modules.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A chiplet is a small integrated circuit that contains a well-defined subset of functionality. A chiplet may be designed to be combined with other chiplets on an interposer in a single package. A set of chiplets may be implemented in a mix-and-match type of assembly, which may provide several advantages over a traditional system on chip (SoC). For example, the same chiplet may be used in different devices. Chiplets may be fabricated with different processes, materials, and nodes, where each chiplet may be optimized for a particular function. Chiplets may be tested before assembly. Multiple chiplets working together in a single integrated circuit may be referred to as a multiple chip (multi-chip) module or an advanced package. Each chiplet may use a different silicon manufacturing process, suitable for a specific device type, computing performance, or power draw requirement.

Chiplets may be associated with standards, such as a Universal Chiplet Interconnect Express (UCIe) specification. The UCIe specification is an open specification for a die-to-die interconnect and serial bus between chiplets. A common chiplet interconnect specification may allow for the intermixing of components from different silicon vendors within the same package and may improve manufacturing yields by using smaller dies. The UCIe specification may define a physical layer, protocol stack, software model, and procedures for compliance testing. The physical layer may support up to 32 gigatransfers per second (GT/s) with 16 to 64 lanes. The physical layer may use a 256 byte flow control unit for data. The UCIe specification may define various on-die interconnect technologies.

Figure 1:
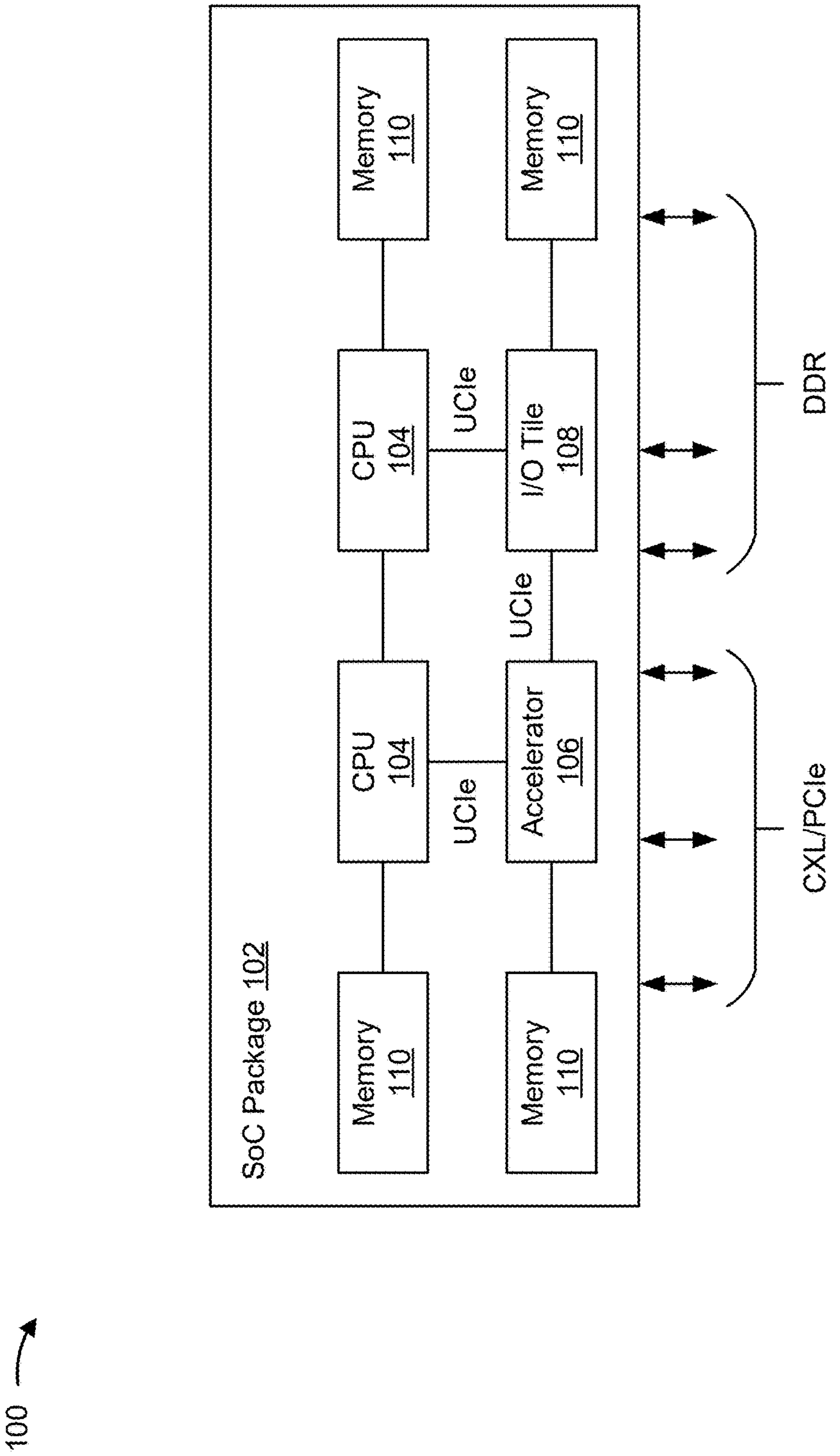
FIG. 1 is a diagram illustrating an example associated with a system on chip (SoC) package, in accordance with the present disclosure.

FIG. 1 is a diagram of an example 100 associated with an SoC package, in accordance with the present disclosure.

As shown in FIG. 1, an SoC package 102 may be composed of one or more central processing units (CPUs) 104, one or more accelerators, and an input/output (I/O) tile 108 connected via UCIe. For example, first and second CPUs may be connected via UCIe. The accelerator 106 and the I/O tile may be connected via UCIe. The CPU 104 and the accelerator 106 may be connected via UCIe. The CPU 104 and the I/O tile may be connected via UCIe. The SoC package 102 may include one or more memories 110. For example, each of the CPU 104, the accelerator 106, and/or the I/O tile 108 may be connected to separate memories 110. The SoC package 102 may support other standards, such as Compute Express Link (CXL) and Peripheral Component Interconnect Express (PCIe). Further, the SoC package 102 may be able to access external memory, such as double data rate (DRR) memory.

As indicated above, FIG. 1 is provided as an example. Other examples may differ from what is described with regard to FIG. 1.

In accordance with a UCIe specification, each module in a multiple module (multi-module) configuration may initialize and train independently, using its sideband. When two or four modules are used, a separate multi-module physical (PHY) logic block may coordinate across the modules. A multi-module PHY logic (MMPL) may be responsible for orchestrating data transfer across multiple modules. Each module in a multi-module link may operate at the same width and speed. During initialization or retraining, when any module failed to train, the MMPL may ensure that a multi-module configuration degrades to a next degraded permitted configuration. Subsequently, any differences in speed and width between the different modules may be resolved.

As part of a sideband assignment, during link initialization, training, and retraining, all sideband messages may be sent on individual module sideband interfaces. For all other sideband messages from upper layers or related to raw die-to-die interface (RDI) state transitions, a single sideband may be used to send and receive sideband messages. A device may send sideband messages on its logical least significant bit (LSB) module sideband interface (Module-0). A sideband message sent on a logical LSB module may be received on a different logical module on a sideband receiver.

On a two-module link or a four-module link, when one or more module pairs have failed, the link may be degraded in accordance with a set of rules. A degraded link may be either one or two modules. The degraded link may not be for three modules. For the four-module link, when any one module-pair has failed, the four-module link may be degraded to the two-module link. For the four-module link, when any two module-pairs have failed, the four-module link may be degraded to the two-module link. For the four-module link, when any three module-pairs have failed, the four-module link may be degraded to a one-module link. For the two-module link, when any one module-pair has failed, the two-module link may be degraded to the one-module link. For the four-module link, when only one module-pair has failed, one additional module-pair that belongs to the same half (e.g., along a die edge) of the four-module link may be disabled or degraded.

A standard package (standard module) may have 16 lanes. The advanced package (advanced module) may have 64 lanes (×64), along with four redundant lanes (RD ×4), and a sideband lane may be common. The sideband lane may support two transmit-receive (Tx-Rx) pairs for data transmission. The 64 lanes may be associated with a mainband. When one or more of the 64 lanes have failed, one or more of the four redundant lanes may be used to maintain a bandwidth. Thus, a physical link of a UCIe may be composed of the sideband and the mainband, where the sideband may be a connection that is used for parameter exchanges and register accesses, and the mainband may be a connection that constitutes a main data path of UCIe.

In an application in which a chiplet is a memory component (e.g., a passive element that does not have processing elements), maintaining high bandwidth in an event of a faulty mainband may be crucial to support necessary throughputs designed for the system. According to the UCIe specification, in an advanced package multi-module implementation, a failure in one module may result in degrading a link to a next supported multi-module configuration. For example, for the four-module link, when any one module-pair fails, the four-module link may be degraded to the two-module link. As another example, for the four-module link, when any two module-pairs fail, the four-module link may be degraded to the two-module link. A degraded link may reduce a bandwidth, even though redundant lanes are available in other modules. In cases where mainbands are faulty in multiple modules, the link may need to fall back to a reduced bandwidth, which may be an inefficient manner in which to management bandwidth and which may heavily impact throughput.

Figure 2A:
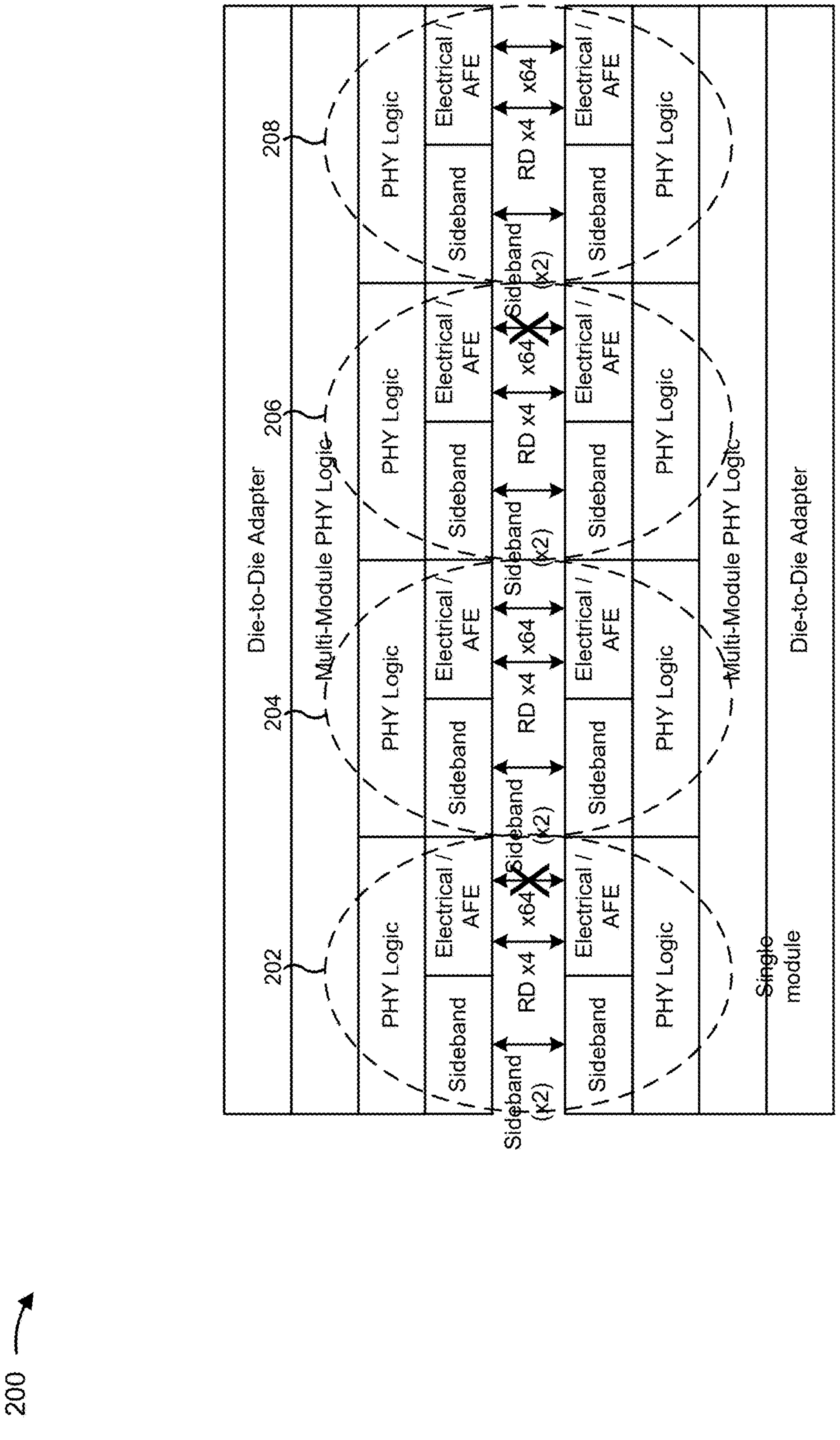
FIGS. 2A-2B are diagrams illustrating examples associated with advanced package multiple module implementations, in accordance with the present disclosure.
Figure 2B:
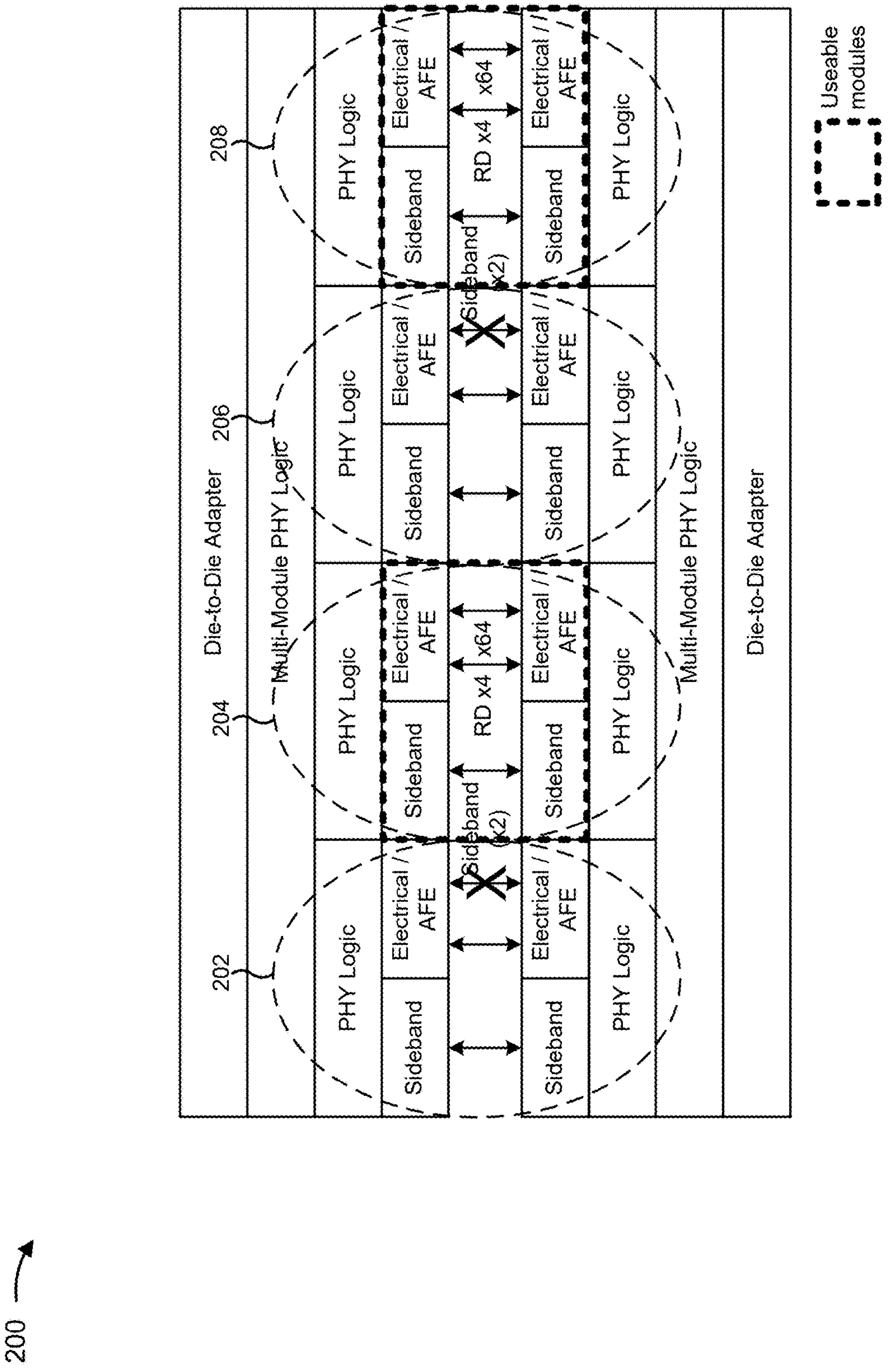

FIGS. 2A-2B are diagrams illustrating examples 200 associated with advanced package multi-module implementations, in accordance with the present disclosure.

As shown in FIG. 2A, an advanced package multi-module implementation may include four modules, such as a first module 202, a second module 204, a third module 206, and a fourth module 208. A four-module link may be associated with the four modules. The four modules may be associated with common multi-module PHY logic and a common die-to-die adapter. Each module may be associated with PHY logic, a sideband, and an electrical or analog front end (AFE) (electrical/AFE). The sideband may be associated with two Tx-Rx pairs for data transmission. The electrical/AFE may be associated with 64 lanes (×64) and four redundant lanes (RD ×4). The 64 lanes may be associated with a mainband. The four-module link may support 256 lanes (e.g., 64 lanes for each module link). Further, the advanced package multi-module implementation may be associated with an upper circuit and a lower circuit, where one side of lanes across the four modules may be associated with the upper circuit and another side of the lanes across the four modules may be associated with the lower circuit. The upper circuit may be associated with a first die, and the lower circuit may be associated with a second die.

In one example, within one module, a first redundant lane (RD0) may be associated with lanes 1-16, a second redundant lane (RD1) may be associated with lanes 17-32, a third redundant lane (RD2) may be associated with lanes 33-48, and a fourth redundant lane (RD3) may be associated with lanes 49-64. Within the first 32 lanes, only two redundant lanes may be available, and within the last 32 lanes, only two redundant lanes may be available. When more than two lanes are faulty within the first 32 lanes, the first 32 lanes may fail. Even though two additional redundant lanes may be functional, those two additional functional lanes may be dedicated to the last 32 lanes and may not be applicable to the first 32 lanes. In this example, the one module may downsize from 64 lanes to 32 lanes.

In another example, when multiple modules are combined to form the advanced package multi-module implementations, one or more lanes in the first module 202 and one or more lanes in the third module 206 may be faulty. The four redundant lanes in the first module 202 may be insufficient to mitigate against the faulty lanes in the first module 202. The four redundant lanes in the third module 206 may be insufficient to mitigate against the faulty lanes in the third module 206. In this example, such faulty lanes may lead to a failure of the first module 202 and the third module 206 (e.g., all 64 lanes in each module may be non-functional). In this example, the advanced package multi-module implementation may be associated with multiple mainband failures (e.g., failures in both the first module and the third module).

As shown in FIG. 2B, when multiple mainband failures occur, an effective link may collapse to only 128 lanes (×128) instead of 256 lanes (×256). For example, the 64 lanes for each of the first module 202 and the third module 206 may be unusable due to an insufficient number of redundant lanes to repair the faulty lanes, which may leave only the 128 lanes associated with the second module 204 and the fourth module 208 to be useable. The effective link may be degraded to 128 lanes, even though functional redundant lanes may be available in the second module 204 and/or the fourth module 208. However, functional redundant lanes associated with the second module 204 may only be used for faulty lanes in the second module 204, and functional redundant lanes associated with the fourth module 208 may only be used for faulty lanes in the fourth module 208, so these functional redundant lanes may not be useable to repair faulty lanes in the first module 202 and the third module 206.

As indicated above, FIGS. 2A-2B are provided as examples. Other examples may differ from what is described with regard to FIGS. 2A-2B.

Various aspects relate generally to integrated circuits. Some aspects more specifically relate to mitigating failed lanes in an advanced package multi-module implementation, where the failed lanes may be mitigated by sharing redundant lanes between modules in a multiple module configuration. In some aspects, a device that employs the advanced package multi-module implementation may support an optimal lane configuration mode. The optimal lane configuration mode may leverage redundant lanes of other modules to be able to form a link with a maximum possible bandwidth. For example, the link may be formed by leveraging the redundant lanes of other modules when more than four faulty lanes are present. The redundant lanes of other modules may be leveraged by enabling a global view of redundant lanes. The global view may involve redundant lanes of all available modules instead of being restricted to a local view that is limited to redundant lanes at a single module level. Further, even within a single module, redundant lanes may not be restricted or limited to an upper circuit of the single module and a lower circuit of the single module. Thus, when the upper circuit has more than two faulty lanes, the upper circuit may utilize redundant lanes associated with the lower circuit. When the lower circuit has more than two faulty lanes, the lower circuit may utilize redundant lanes associated with the upper circuit. Within the single module, the global view may enable any redundant lane associated with the upper/lower circuits of any module to be utilized to repair faulty lanes.

Particular aspects of the subject matter described in this disclosure can be implemented to realize one or more of the following potential advantages. In some examples, by leveraging the redundant lanes of other modules, the described techniques can be used by the device to improve a throughput in case of failure in a mainband of a module. The device may utilize redundant lanes from other modules when faulty lanes in one module are present. The ability to utilize the redundant lanes from other modules may avoid the one module with faulty lanes from being unuseable, which would otherwise degrade a link bandwidth. An ability to use the redundant lanes of the other modules may help to maintain high throughput even in a highly faulty environment. A reliability of modules may be increased by leaving existing redundant lanes of other modules, which may be required in an auto domain to counter ageing effects. By using the redundant lanes from the other modules, the link bandwidth may be maintained, thereby improving an overall system performance.

As indicated above, FIG. 2 is provided as an example. Other examples may differ from what is described with regard to FIG. 2.

Figure 3:
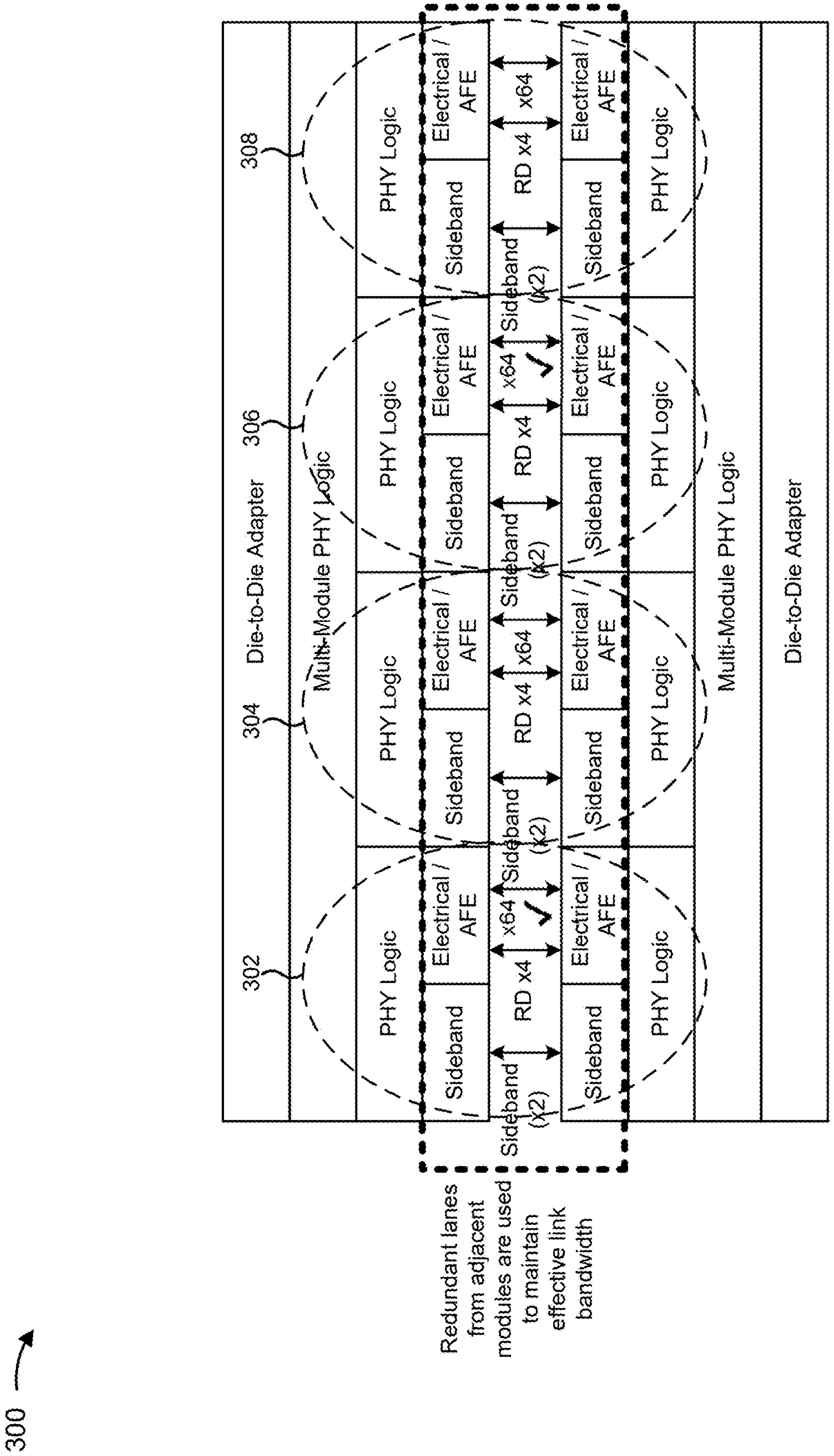
FIG. 3 is a diagram of an example associated with sharing redundant lanes between modules in a multiple module configuration, in accordance with the present disclosure.

FIG. 3 is a diagram of an example 300 associated with sharing redundant lanes between modules in a multiple module configuration, in accordance with the present disclosure.

As shown in FIG. 3, a device that employs an advanced package multi-module implementation may include four modules, such as a first module 302, a second module 304, a third module 306, and a fourth module 308. A four-module link may be associated with the four modules. The four modules may be associated with common multi-module PHY logic and a common die-to-die adapter. Each module may be associated with PHY logic, a sideband, and an electrical or AFE. The electrical or AFE may be associated with 64 lanes (×64) and four redundant lanes (RD ×4). The 64 lanes may be associated with a mainband. The four-module link may support 256 lanes (e.g., 64 lanes for each module link).

In some aspects, multiple mainband failures may occur. For example, both the first module 302 and the third module 306 may be associated with faulty lanes. In this example, redundant lanes from other modules, such as the second module 304 and/or the fourth module 308, may be utilized to mitigate the faulty lanes in the first module 302 and the third module 306. In order to resolve the multiple mainband failures, other redundant lanes may be utilized based at least in part on a global view of redundant lanes, where redundant lanes of all modules of the advanced package multi-module implementation may be available to use in place of faulty lanes in given modules. A redundant lane of any other module of the advanced package multi-module implementation may be accessed in order to repair a faulty lane, even when the redundant lane and the faulty lane are associated with different modules. When multiple mainband failures occur, the redundant lanes from adjacent modules may be leveraged and an effective link bandwidth may be maintained. In this example, the effective link bandwidth of ×256 (e.g., due to all 256 lanes being functional) may be maintained, rather than downgrading the effective link bandwidth to ×128 (e.g., 128 lanes).

In some aspects, the device may employ the advanced package multi-module implementation. The device may include multiple modules, such as four modules. The multiple modules may be associated with a multi-module link. The device may perform various functions using an MMPL. The device may employ an optimal lane configuration mode. The optimal lane configuration mode may leverage redundant lanes of other modules to be able to form a link with a maximum possible bandwidth. The redundant lanes of other modules may be leveraged by enabling a global view of redundant lanes. The global view may involve redundant lanes of all available modules instead of being restricted to a local view that is limited to redundant lanes at a single module level.

In some aspects, the device may include a first register, such as an optimal lane configuration register. The first register may store an indication of whether the optimal lane configuration mode is supported. The first register may indicate that the optimal lane configuration mode is enabled, or the first register may indicate that the optimal lane configuration mode is disabled. During a module parameter exchange, modules may perform a handshaking procedure with each other, and whether the optimal lane configuration mode is supported, in accordance with the first register, may be exchanged during the handshaking procedure.

In some aspects, the device may include a second register, such as a redundant functional lane register. After an initial link training, all redundant lanes in each module may be trained for functionality and updated in the second register. The second register may indicate all of the redundant lanes in each module, where all redundant lanes that are indicated in the second register may have already been trained for functionality. Each module may be able to access the second register, such that each module may be aware of the redundant lanes in all of the other modules, instead of having a limited view of only redundant lanes within the same module. By enabling the second register to be accessible to all of the modules, each module may have a global view of redundant lanes.

In some aspects, during a link training, the MMPL may detect a number of faulty lanes within a given module that exceeds a threshold. For example, the MMPL may detect that more than four lanes are faulty in a single module. In this case, the MMPL may not move a state machine to a train error state. Rather, the MMPL may check for functional and unused redundant lanes in other modules. When unused redundant lanes are available in other modules, the MMPL may configure some of those unused redundant lanes to be used as redundant lanes for the module having the number of faulty lanes that exceeds the threshold. The MMPL may be able to initiate a repair of the faulty lanes using the redundant lanes from the other modules. The MMPL may fix the faulty lanes using the redundant lanes from the other modules, rather than moving into the train error state. As a result, the MMPL may not need to collapse the module to align with existing supported link widths, thereby improving an overall bandwidth. Further, at a PHY level, a repair mechanism may be leveraged for mapping redundant lanes across modules, where the mapping may allow the MMPL to check whether functional and unused redundant lanes in other modules are available.

As indicated above, FIG. 3 is provided as an example. Other examples may differ from what is described with regard to FIG. 3.

Figure 4:
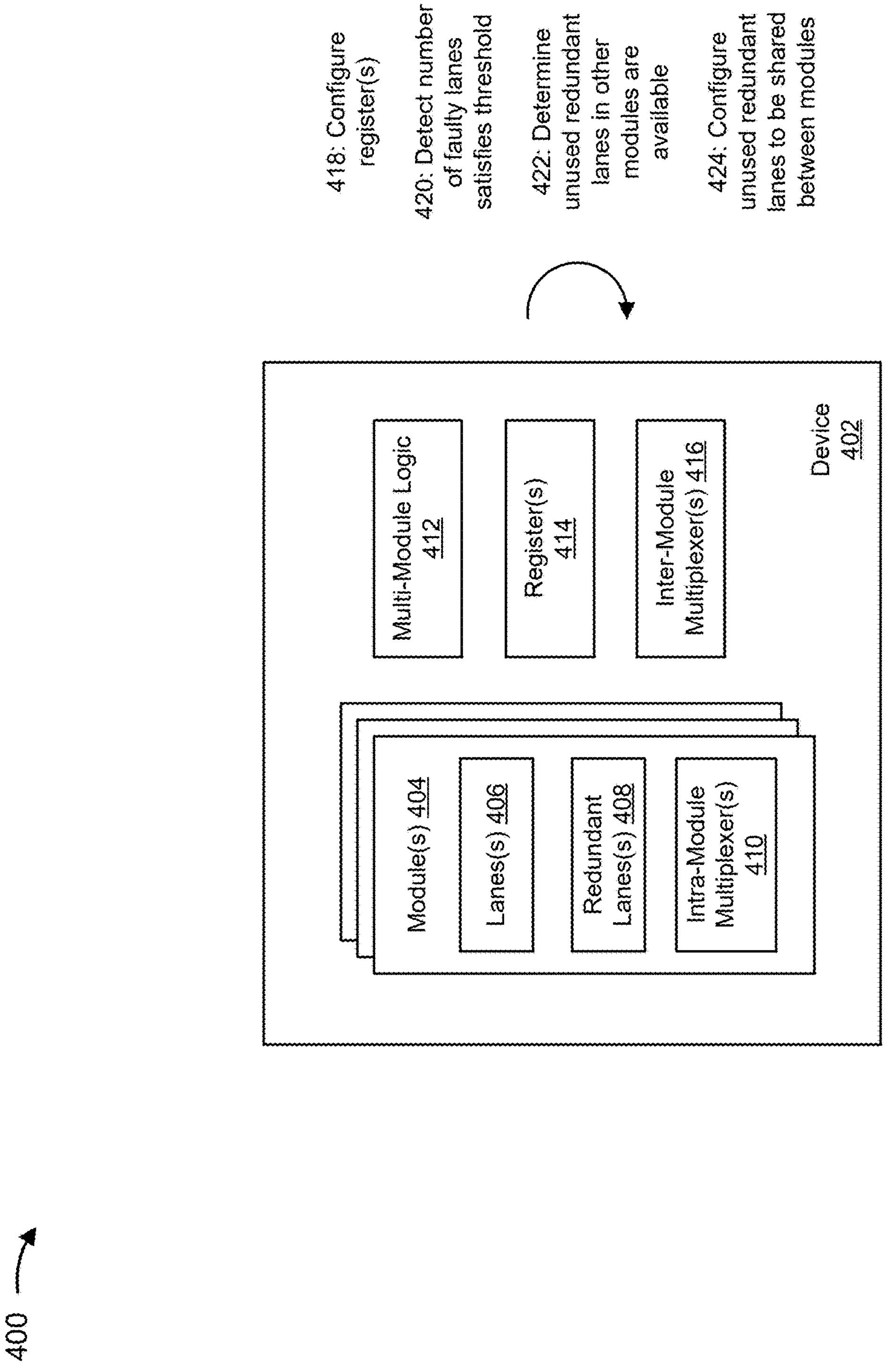
FIG. 4 is a diagram of an example associated with sharing redundant lanes between modules in a multiple module configuration, in accordance with the present disclosure.

FIG. 4 is a diagram of an example 400 associated with sharing redundant lanes between modules in a multiple module configuration, in accordance with the present disclosure.

As shown in FIG. 4, a device 402, such as an SoC, may be associated with an advanced package multi-module implementation. The device 402 may include a plurality of modules 404 (e.g., four modules). The plurality of modules 404 may be in accordance with a UCIe specification. A module 404 of the plurality of modules 404 may include a plurality of lanes for data 406 and a plurality of redundant lanes 408. For example, the module 404 may include 64 lanes for data and four redundant lanes. The module 404 may include intra-module multiplexers 410. The device 402 may include a multi-module logic 412 (e.g., MMPL), one or more registers 414 such as a first register and a second register, and one or more inter-module multiplexers 416.

As shown by reference number 418, the multi-module logic 412 may configure the first register to indicate that unused redundant lanes of the other modules 404 are useable to repair faulty lanes across different modules 404. In some aspects, the multi-module logic 412 may configure the second register that indicates functional redundant lanes for each module 404 of the plurality of modules 404.

As shown by reference number 420, the multi-module logic 412 may detect that a number of faulty lanes for data in the module 404, of the plurality of lanes for data, satisfies a threshold. For example, the multi-module logic 412 may detect more than four faulty lanes in the module 404, where the more than four faulty lanes may satisfy the threshold. In this case, the threshold may be set to four.

As shown by reference number 422, the multi-module logic 412 may determine that one or more unused redundant lanes, in the module 404 or other modules of the plurality of modules 404, are available. The multi-module logic 412 may identify the one or more unused redundant lanes, in the module 404 or the other modules of the plurality of modules 404, based at least in part on a global view of redundant lanes across the plurality of modules 404. The multi-module logic 412 may identify the one or more unused redundant lanes based at least in part on the first register and/or the second register, which may indicate specific redundant lanes across the plurality of modules 404 and that sharing redundant lanes across the plurality of modules 404 is permitted.

As shown by reference number 424, the multi-module logic 412 may configure the one or more unused redundant lanes to be used as redundant lanes for the module 404, where the one or more unused redundant lanes may be configured to be shared between modules of the plurality of modules 404. The multi-module logic 412 may configure the one or more unused redundant lanes based at least in part on the first register and/or the second register, which may indicate specific redundant lanes across the plurality of modules 404 and that sharing redundant lanes across the plurality of modules 404 is permitted. In some aspects, the multi-module logic 412 may configure the one or more unused redundant lanes to be used as the redundant lanes for the module 404 based at least in part on a mapping. The mapping may map each faulty lane to an appropriate redundant lane in the module 404 or in one of the other modules. The mapping may be based at least in part on a left shift operation or a right shift operation that bypasses faulty lanes.

In some aspects, the plurality of modules 404 may include a first module and a second module. The intra-module multiplexers 410 may include a first intra-module multiplexer and a second intra-module multiplexer. The first module may include the first intra-module multiplexer, which may be associated with a first die. The first module may also include the second intra-module multiplexer, which may be associated with a second die. The first intra-module multiplexer and the second intra-module multiplexer may allow for communication between the first die and the second die. Further, an inter-module multiplexer 416 between the first module and the second module may allow for communication between the first module and the second module. The communication between the first die and the second die and the communication between the first module and the second module may involve sharing information regarding redundant lanes across the plurality of modules 404.

As indicated above, FIG. 4 is provided as an example. Other examples may differ from what is described with regard to FIG. 4.

Figure 5:
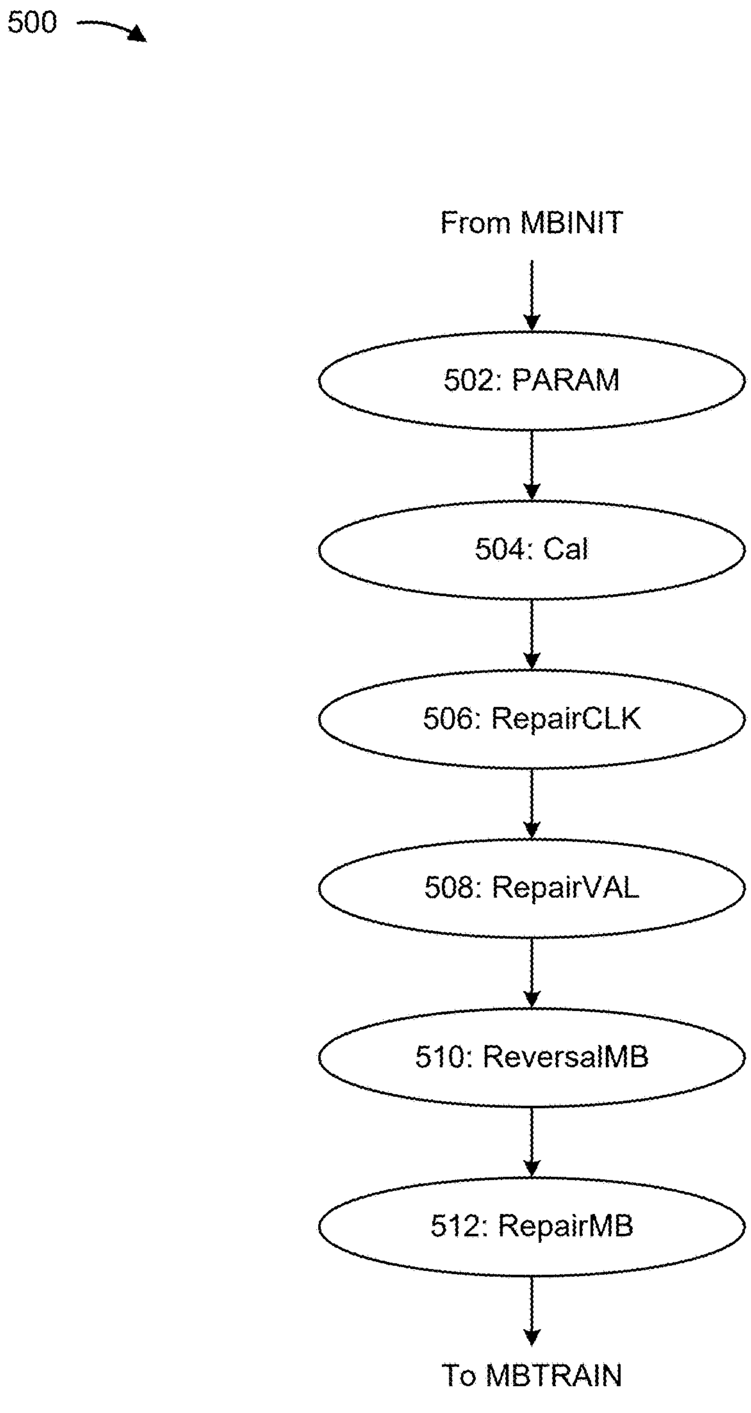
FIG. 5 is a diagram of an example associated with a Universal Chiplet Interconnect Express (UCIe) link training state machine, in accordance with the present disclosure.

FIG. 5 is a diagram of an example 500 associated with a UCIe link training state machine, in accordance with the present disclosure.

As shown by reference number 502, during a mainband initialization (MBINIT) and repair flow that is based at least in part on a UCIe link training state machine, a parameter exchange (PARAM) may occur after a mainband initialization. During the parameter exchange, a module configuration may be communicated with module partners, where the module configuration may indicate a total number of modules and whether an optimal lane configuration mode is supported. The optimal lane configuration mode may allow redundant lanes to be shared between modules. As shown by reference number 504, a calibration (Cal) may be performed. As shown by reference number 506, a clock repair (RepairCLK) may be performed. As shown by reference number 508, a valid lane repair (RepairVAL) may be performed. As shown by reference number 510, a data lane reversal (ReversalMB) may be detected. As shown by reference number 512, a mainband lane repair (RepairMB) may be performed, which may be followed by a mainband training (MBTRAIN).

In some aspects, faulty lanes may be repaired with the help of redundant lanes. When the optimal lane configuration mode is not supported and a number of faulty lanes is greater than four, a repair may not be possible and a downgrade may be needed. The module may inform an MMPL that the module cannot form a link, so the MMPL may consider the module to be faulty and may then implement the downgrade. When the optimal lane configuration mode is supported and the number of faulty lanes is greater than four, the module may still be able to establish the link when redundant lanes are available in other modules. The module may inform the MMPL of the faulty lanes, and the MMPL may consider a repair by leveraging unused redundant lanes from the other modules.

As indicated above, FIG. 5 is provided as an example. Other examples may differ from what is described with regard to FIG. 5.

Figure 6:
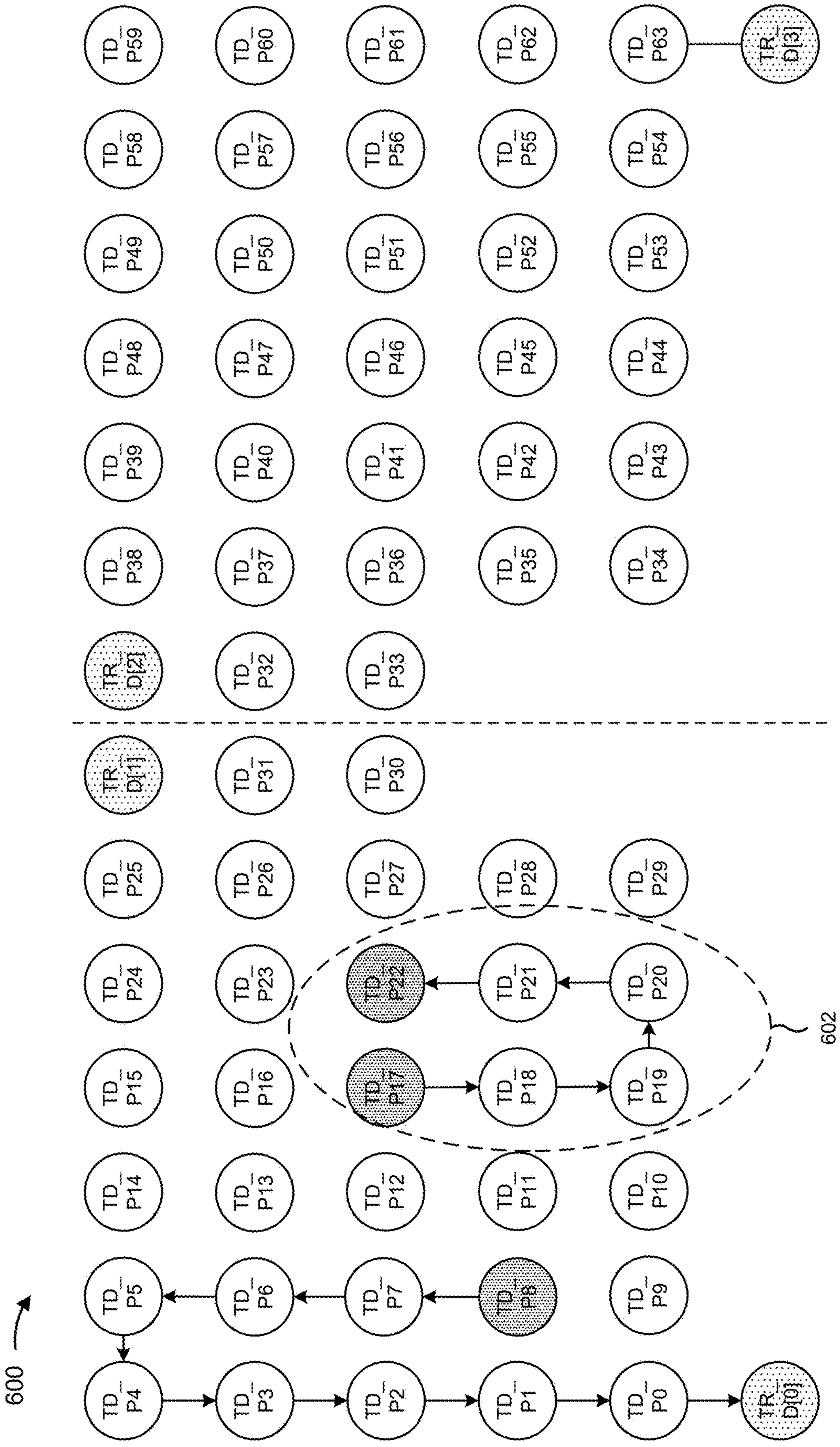
FIG. 6 is a diagram of an example associated with a conventional implementation of an intra-module repair, in accordance with the present disclosure.

FIG. 6 is a diagram of an example 600 associated with a conventional implementation of an intra-module repair, in accordance with the present disclosure.

As shown in FIG. 6, a module may be associated with 64 lanes. Lanes 1-32 may be associated with TD_P0 to TD_P31, respectively. Lanes 1-32 may be associated with an upper circuit of the module. A first two redundant lanes may be represented by TR_D[0] and TR_D[1]. The first two redundant lanes may be associated with the upper circuit. Lanes 33-64 may be associated with TD_P32 to TD_P63, respectively. Lanes 33-64 may be associated with a lower circuit of the module. A second two redundant lanes may be represented by TR_D[2] and TR_D[3]. The second two redundant lanes may be associated with the lower circuit.

Faulty lanes may be mapped to redundant lanes in ascending order. Logical lanes may be contiguous. Physical lanes may not need to be contiguous. In case of a faulty lane, the lane may be tri-stated and connections may be mapped with a redundant lane.

In the upper circuit, the first 16 lanes may be mapped to TR_D[0] using a left shift and the next 16 lanes may be mapped to TR_D[1] using a right shift. In this example, TD_P8 may be a first lane that is detected as being faulty. TD_P8 may be mapped to TR_D[0] based at least in part on the left shift. TD_P17 may be a next lane that is detected as being faulty. TD_P17 may be attempted to be mapped to TR_D[1] based at least in part on the right shift. However, as shown by reference number 602, during the mapping, TD_P22 may also be detected as being faulty. In this case, the mapping results in an error because both TD_P17 and TD_P22 cannot be mapped to TR_D[1] using the right shift.

As indicated above, FIG. 6 is provided as an example. Other examples may differ from what is described with regard to FIG. 6.

Figure 7:
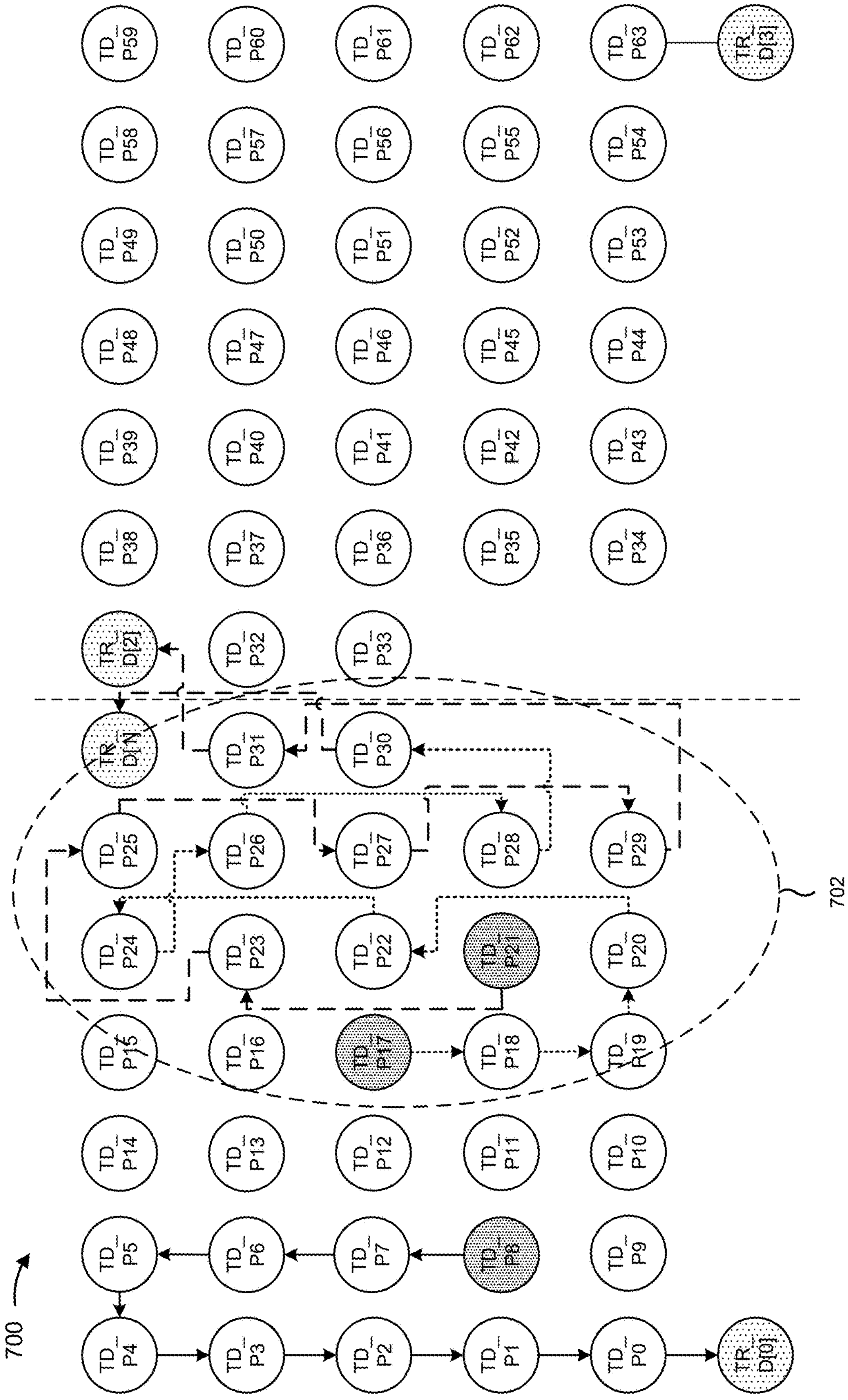
FIG. 7 is a diagram of an example associated with intra-module repair, in accordance with the present disclosure.

FIG. 7 is a diagram of an example 700 associated with intra-module repair that addresses issues in FIG. 6, in accordance with the present disclosure.

As shown in FIG. 7, TD_P8 may be a first lane that is detected as being faulty. TD_P8 may be mapped to TR_D[0] based at least in part on a left shift. TD_P17 may be a next lane that is detected as being faulty. TD_P17 may be mapped to TR_D[1] based at least in part on a right shift. During the mapping of TD_P17 to TR_D[1], TD_P21 may also be detected as being faulty. In this case, the mapping of TD P17 to TR_D[1] may skip TD_P21 (since TD_P21 is faulty) and map to the next lane (e.g., TD_P22). When a certain lane is "skipped" during a mapping, the mapping may not include that certain lane and instead proceed to a next lane. A lane may be skipped due to the lane being faulty or due to the lane being associated with another mapping. The mapping of TD P17 may then go to TD_P24, TD_P26, TD_P28, TD_P30, and then to TR_D[1]. TD_P21 may be mapped to TR_D[2] based at least in part on the right shift. The mapping of TD_P21 may go to TD_P23, TD_P25, TD_P27, TD_P29, TD_P31, and then to TR_D[2]. TD_P21 may be mapped to TR_D[2] even though TR_D[2] is associated with a lower circuit and TD_P21 is associated with an upper circuit, which may be based at least in part on a global view of redundant lanes. In this example, a module repair may be the intra-module repair because one or more faulty lanes may be mapped to one or more redundant lanes as part of the module repair, where the one or more redundant lanes are all associated with the same module. From this point forward, as shown by reference number 702, TD_P17 and TD_P21 may each skip one lane during the mapping, which may allow TD_P17 to be mapped to TR_D[1] and TD_P21 to be mapped to TR_D[2].

As indicated above, FIG. 7 is provided as an example. Other examples may differ from what is described with regard to FIG. 7.

Figure 8:
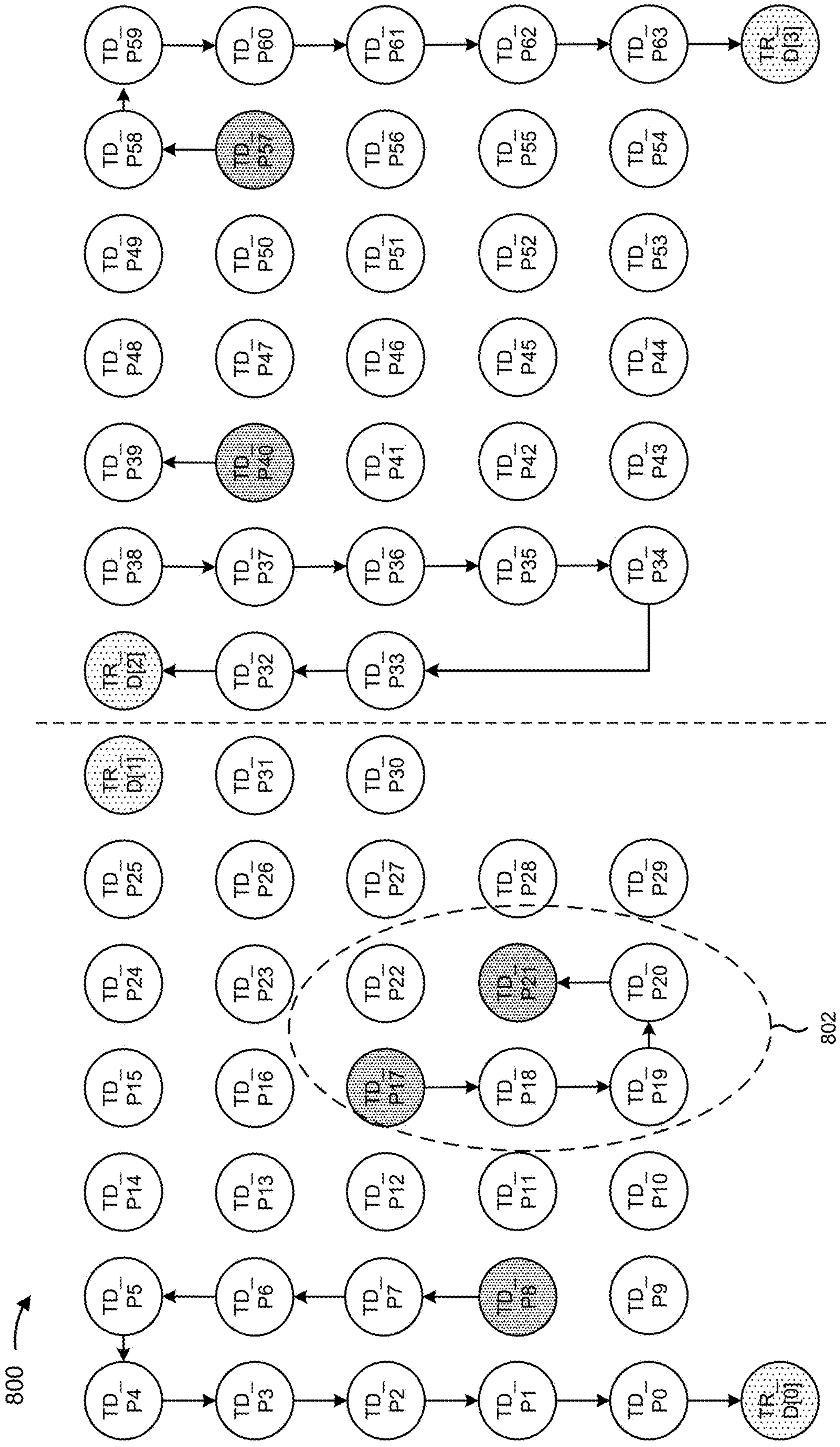
FIG. 8 is a diagram of an example associated with a conventional implementation of an inter-module repair, in accordance with the present disclosure.

FIG. 8 is a diagram of an example 800 associated with a conventional implementation of an inter-module repair, in accordance with the present disclosure.

As shown in FIG. 8, TD_P8 may be a first lane that is detected as being faulty. TD_P8 may be mapped to TR_D[0] based at least in part on a left shift. TD_P17 may be a next lane that is detected as being faulty. TD_P17 may be attempted to be mapped to TR_D[1] based at least in part on a right shift. However, during the mapping, TD_P22 may also be detected as being faulty. In this case, as shown by reference number 802, the mapping results in an error because both TD_P17 and TD_P22 cannot be mapped to TR_D[1] using the right shift. Additionally, TD_P40 and TD_P57 may be associated with faulty lanes. TD_P40 may be mapped to TR_D[2] using the left shift, and TD_P57 may be mapped to TR_D[3] using the right shift.

As indicated above, FIG. 8 is provided as an example. Other examples may differ from what is described with regard to FIG. 8.

Figure 9:
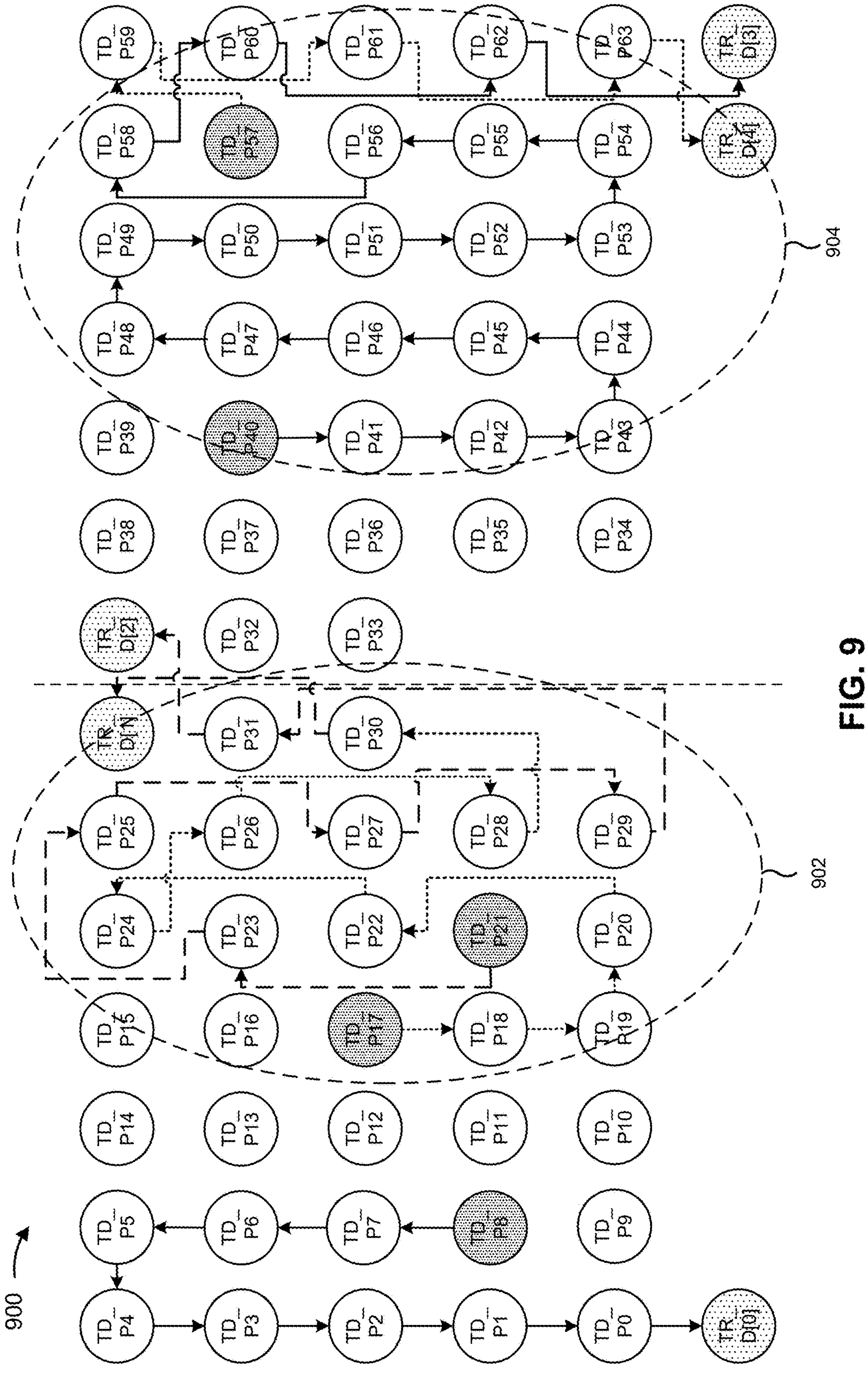
FIG. 9 is a diagram of an example associated with inter-module repair, in accordance with the present disclosure.

FIG. 9 is a diagram of an example 900 associated with inter-module repair that addresses issues in FIG. 8, in accordance with the present disclosure.

As shown in FIG. 9, TD_P8 may be a first lane that is detected as being faulty. TD_P8 may be mapped to TR_D[0] based at least in part on a left shift. TD_P17 may be a next lane that is detected as being faulty. TD_P17 may be mapped to TR_D[1] based at least in part on a right shift. During the mapping of TD_P17 to TR_D[1], TD_P21 may also be detected as being faulty. In this case, the mapping may skip TD_P21 and map to the next lane (e.g., TD_P22). TD_P21 may be mapped to TR_D[2] based at least in part on the right shift. TD_P21 may be mapped to TR_D[2] even though TR_D[2] is associated with a lower circuit and TD_P21 is associated with an upper circuit, which may be based at least in part on a global view of redundant lanes. From this point forward, as shown by reference number 902, TD_P17 and TD_P21 may each skip one lane during the mapping, which may allow TD_P17 to be mapped to TR_D[2] and TD_P21 to be mapped to TR_D[2].

Additionally, TD_P40 and TD_P57 may be associated with faulty lanes. TD_P40 cannot be mapped to TR_D[2] using the left shift because TD_P21 is already mapped to TR_D[2]. TD_P40 may be mapped to TR_D[3] using the right shift. During the mapping of TD_P40, TD_P57 may also be detected as being faulty. In this case, the mapping may skip TD_P57 and map to the next lane (e.g., TD_58). From this point forward, as shown by reference number 904, TD_P40 and TD_P57 may each skip one lane during the mapping, which may allow TD_P40 to be mapped to TR_D [3] and TD_P57 to be mapped to TR_D[4]. TR_D[4] may be associated with a different module but TD_P57 may be allowed to be mapped to TR_D[4] based at least in part on the global view of redundant lanes. In this example, a module repair may be the inter-module repair because one or more faulty lanes may be mapped to one or more redundant lanes as part of the module repair, where the one or more redundant lanes may not be all associated with the same module. For example, TR_D[4] may be associated with a different module as compared to TR_D[0], TR_D[1], TR_D [2], and TR_D[3].

As indicated above, FIG. 9 is provided as an example. Other examples may differ from what is described with regard to FIG. 9.

Figure 10:
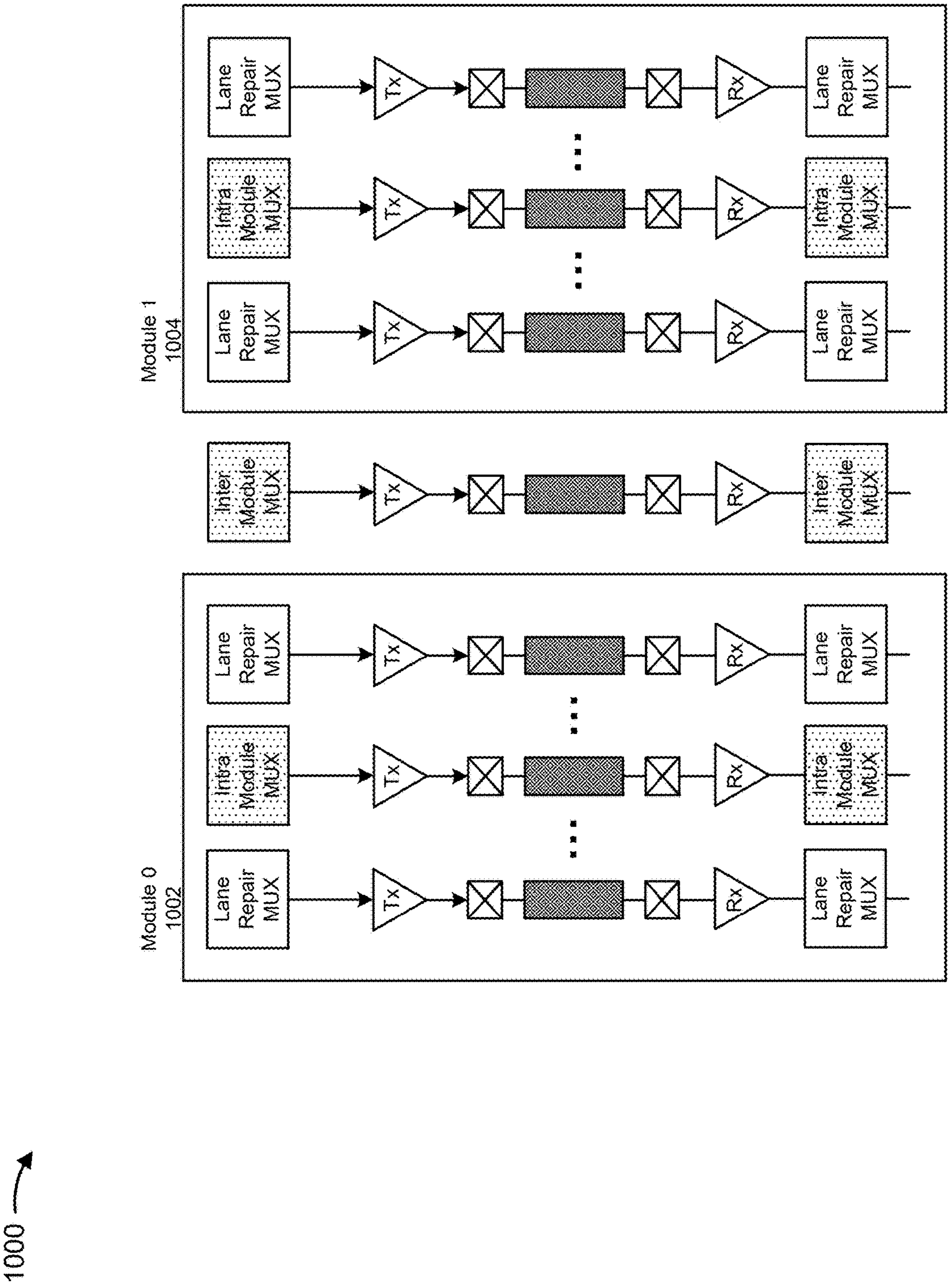
FIG. 10 is a diagram of an example associated with inter-module multiplexers and intra-module multiplexers, in accordance with the present disclosure.

FIG. 10 is a diagram of an example 1000 associated with inter-module multiplexers and intra-module multiplexers, in accordance with the present disclosure.

As shown in FIG. 10, a device may include a first module 1002 (module 0) and a second module 1004 (module 1). Each module may include a plurality of lanes. For a given lane, one side may be associated with an upper circuit of the first module 1002 and the other side may be associated with a lower circuit of the first module 1002. An intra-module multiplexer (MUX) may be associated with the upper circuit and an intra-module multiplexer may be associated with the lower circuit, which may enable communication between the upper circuit and the lower circuit. Such communication may allow for information regarding redundant lanes to be shared between the upper circuit and the lower circuit. Without having the intra-module multiplexer at each circuit, the upper circuit may not communicate with the lower circuit, which may prevent the information regarding the redundant lanes from being shared.

Additionally, an inter-module multiplexer may be associated with the upper circuit and an inter-module multiplexer may be associated with the lower circuit, which may enable communication between the first module 1002 and the second module 1004. Such inter-module multiplexers may be in between the first module 1002 and the second module 1004. Such communication may allow for information regarding redundant lanes to be shared between the first module 1002 and the second module 1004. Without having the inter-module multiplexers, the first module 1002 may not communicate with the second module 1004, which may prevent the information regarding the redundant lanes from being shared.

As indicated above, FIG. 10 is provided as an example. Other examples may differ from what is described with regard to FIG. 10.

Figure 11:
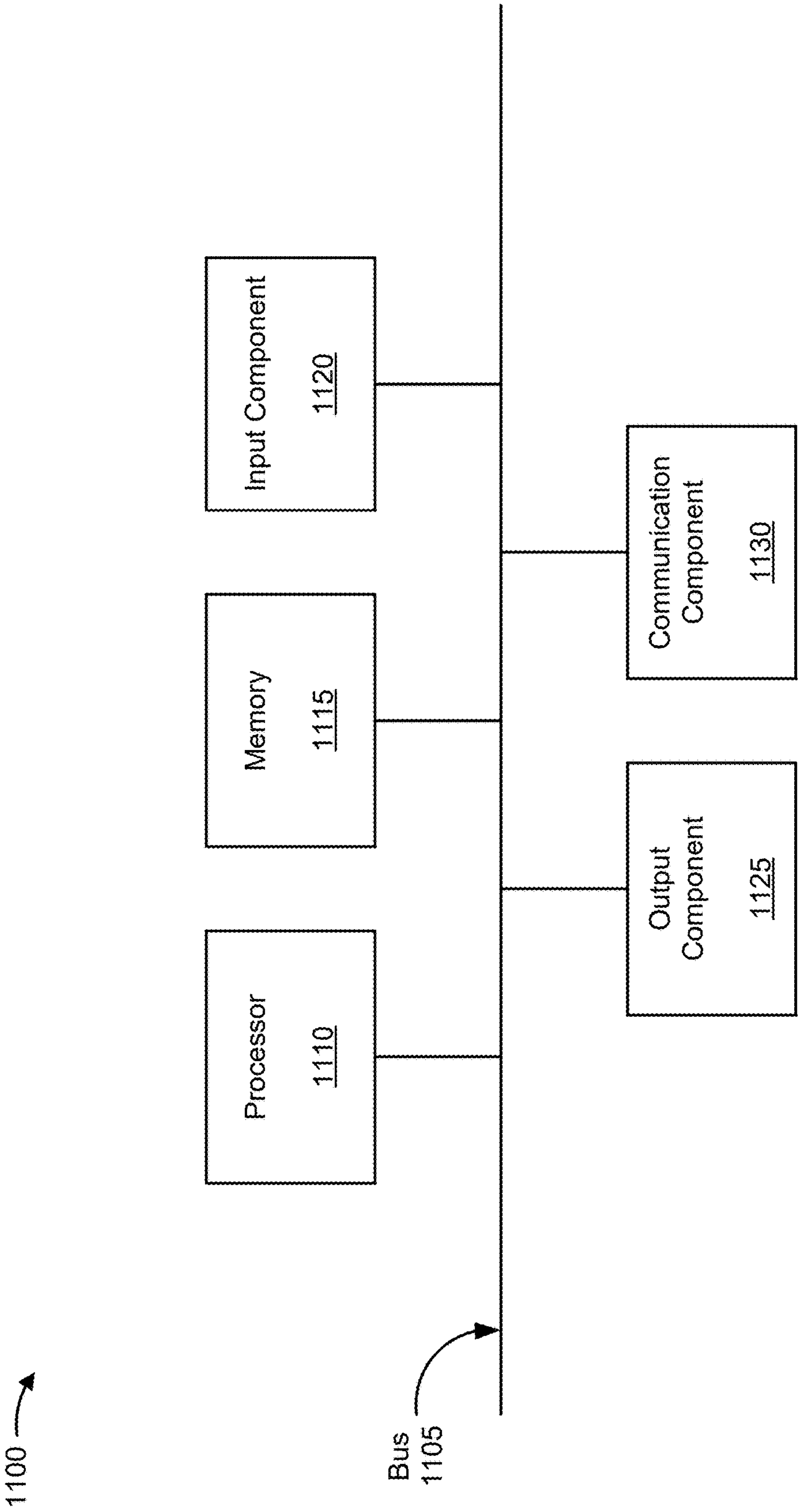
FIG. 11 is a diagram illustrating example components of a device, in accordance with the present disclosure.

FIG. 11 is a diagram illustrating example components of a device 1100, in accordance with the present disclosure. The device 1100 may be associated with sharing redundant lanes between modules in a multiple module configuration. As shown in FIG. 11, the device 1100 may include a bus 1105, a processor 1110, a memory 1115, an input component 1120, an output component 1125, and/or a communication component 1130.

The bus 1105 may include one or more components that enable wired and/or wireless communication among the components of the device 1100. The bus 1105 may couple together two or more components of FIG. 11, such as via operative coupling, communicative coupling, electronic coupling, and/or electric coupling. For example, the bus 1105 may include an electrical connection (e.g., a wire, a trace, and/or a lead) and/or a wireless bus. The processor 1110 may include a central processing unit, a graphics processing unit, a microprocessor, a controller, a microcontroller, a digital signal processor, a field-programmable gate array, an application-specific integrated circuit, and/or another type of processing component. The processor 1110 may be implemented in hardware, firmware, or a combination of hardware and software. In some aspects, the processor 1110 may include one or more processors capable of being programmed to perform one or more operations or processes described elsewhere herein.

The memory 1115 may include volatile and/or nonvolatile memory. For example, the memory 1115 may include random access memory (RAM), read only memory (ROM), a hard disk drive, and/or another type of memory (e.g., a flash memory, a magnetic memory, and/or an optical memory). The memory 1115 may include internal memory (e.g., RAM, ROM, or a hard disk drive) and/or removable memory (e.g., removable via a universal serial bus connection). The memory 1115 may be a non-transitory computer-readable medium. The memory 1115 may store information, one or more instructions, and/or software (e.g., one or more software applications) related to the operation of the device 1100. In some aspects, the memory 1115 may include one or more memories that are coupled (e.g., communicatively coupled) to one or more processors (e.g., processor 1110), such as via the bus 1105. Communicative coupling between a processor 1110 and a memory 1115 may enable the processor 1110 to read and/or process information stored in the memory 1115 and/or to store information in the memory 1115.

The input component 1120 may enable the device 1100 to receive input, such as user input and/or sensed input. For example, the input component 1120 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1125 may enable the device 1100 to provide output, such as via a display, a speaker, and/or a light-emitting diode. The communication component 1130 may enable the device 1100 to communicate with other devices via a wired connection and/or a wireless connection. For example, the communication component 1130 may include a receiver, a transmitter, a transceiver, a modem, a network interface card, and/or an antenna.

The device 1100 may perform one or more operations or processes described herein. For example, a non-transitory computer-readable medium (e.g., memory 1115) may store a set of instructions (e.g., one or more instructions or code) for execution by the processor 1110. The processor 1110 may execute the set of instructions to perform one or more operations or processes described herein. In some aspects, execution of the set of instructions, by one or more processors 1110, causes the one or more processors 1110 and/or the device 1100 to perform one or more operations or processes described herein. In some aspects, hardwired circuitry may be used instead of or in combination with the instructions to perform one or more operations or processes described herein. Additionally, or alternatively, the processor 1110 may be configured to perform one or more operations or processes described herein. Thus, aspects described herein are not limited to any specific combination of hardware circuitry and software.

The number and arrangement of components shown in FIG. 11 are provided as an example. The device 1100 may include additional components, fewer components, different components, or differently arranged components than those shown in FIG. 11. Additionally, or alternatively, a set of components (e.g., one or more components) of the device 1100 may perform one or more functions described as being performed by another set of components of the device 1100.

Figure 12:
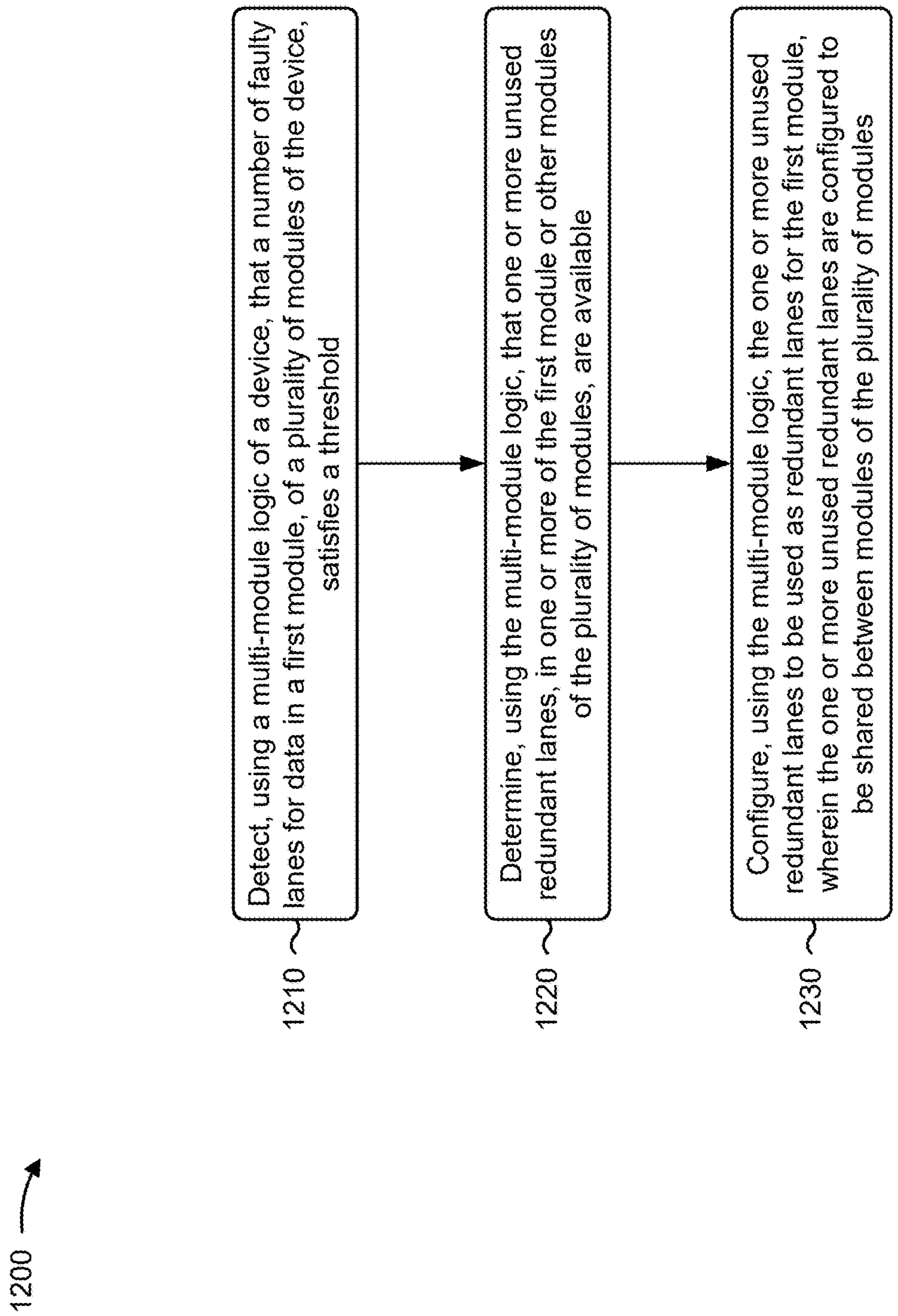
FIG. 12 is a flowchart of an example process associated with sharing redundant lanes between modules in a multiple module configuration, in accordance with the present disclosure.

FIG. 12 is a flowchart of an example process 1200 associated with sharing redundant lanes between modules in a multiple module configuration, in accordance with the present disclosure. In some implementations, one or more process blocks of FIG. 12 are performed by a device (e.g., device 402). Additionally, or alternatively, one or more process blocks of FIG. 12 may be performed by one or more components of device 1100, such as processor 1110, memory 1112, input component 1120, output component 1130, and/or communication component 1135.

As shown in FIG. 12, process 1200 may include detecting, using a multi-module logic of a device, that a number of faulty lanes for data in a module, of a plurality of modules of the device, satisfies a threshold (block 1210). For example, the device may detect, using a multi-module logic of a device, that a number of faulty lanes for data in a module, of a plurality of modules of the device, satisfies a threshold, as described above.

As further shown in FIG. 12, process 1200 may include determining, using the multi-module logic, that one or more unused redundant lanes, in one or more of the module or other modules of the plurality of modules, are available (block 1220). For example, the device may determine, using the multi-module logic, that one or more unused redundant lanes, in one or more of the module or other modules of the plurality of modules, are available, as described above.

As further shown in FIG. 12, process 1200 may include configuring, using the multi-module logic, the one or more unused redundant lanes to be used as redundant lanes for the module, wherein the one or more unused redundant lanes are configured to be shared between modules of the plurality of modules (block 1230). For example, the device may configure, using the multi-module logic, the one or more unused redundant lanes to be used as redundant lanes for the module, wherein the one or more unused redundant lanes are configured to be shared between modules of the plurality of modules, as described above.

Process 1200 may include additional implementations, such as any single implementation or any combination of implementations described below and/or in connection with one or more other processes described elsewhere herein.

In a first implementation, process 1200 includes configuring, using the multi-module logic, a register that indicates that unused redundant lanes of the other modules are useable to repair faulty lanes across different modules, wherein the one or more unused redundant lanes are configured based at least in part on the register.

In a second implementation, alone or in combination with the first implementation, process 1200 includes configuring, using the multi-module logic, a register that indicates functional redundant lanes for each module of the plurality of modules, wherein the one or more unused redundant lanes are configured based at least in part on the register.

In a third implementation, alone or in combination with one or more of the first and second implementations, process 1200 includes identifying the one or more unused redundant lanes, in one or more of the module or the other modules of the plurality of modules, based at least in part on a global view of redundant lanes across the plurality of modules.

In a fourth implementation, alone or in combination with one or more of the first through third implementations, process 1200 includes configuring the one or more unused redundant lanes to be used as the redundant lanes for the module based at least in part on a mapping, wherein the mapping maps each faulty lane to an appropriate redundant lane in the module or in one of the other modules, and the mapping is based at least in part on a left shift operation or a right shift operation that bypasses faulty lanes.

In a fifth implementation, alone or in combination with one or more of the first through fourth implementations, the module is a first module, the plurality of modules includes the first module and a second module, the first module includes a first intra-module multiplexer associated with a first die and a second intra-module multiplexer associated with a second die, the first intra-module multiplexer and the second intra-module multiplexer allow for communication between the first die and the second die, and an inter-module multiplexer between the first module and the second module allows for communication between the first module and the second module.

In a sixth implementation, alone or in combination with one or more of the first through fifth implementations, the communication between the first die and the second die and the communication between the first module and the second module involve sharing information regarding redundant lanes across the plurality of modules.

In a seventh implementation, alone or in combination with one or more of the first through sixth implementations, the plurality of modules are in accordance with a UCIe specification.

Although FIG. 12 shows example blocks of process 1200, in some implementations, process 1200 includes additional blocks, fewer blocks, different blocks, or differently arranged blocks than those depicted in FIG. 12. Additionally, or alternatively, two or more of the blocks of process 1200 may be performed in parallel.

Figure 13:
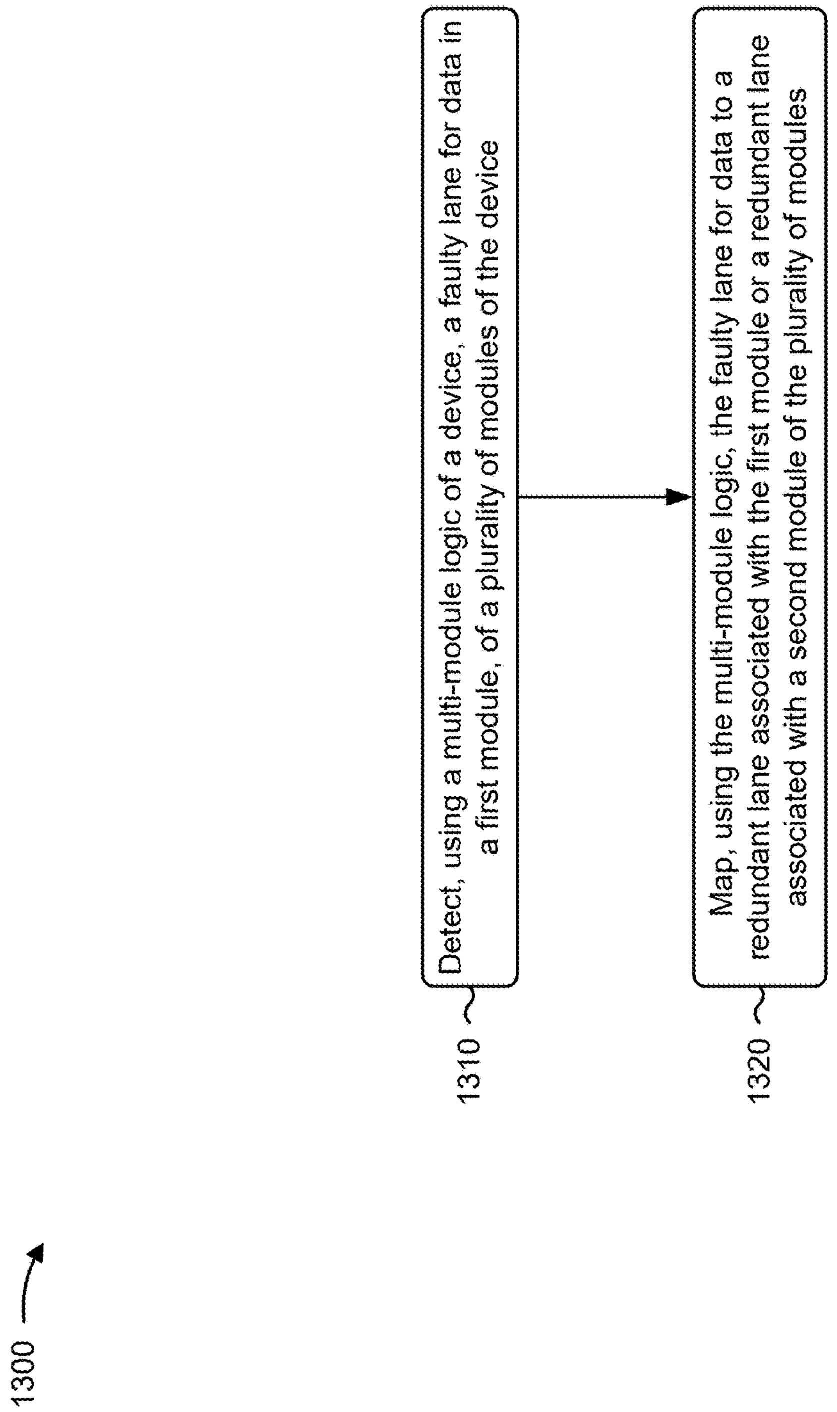
FIG. 13 is a flowchart of an example process associated with detecting a faulty lane and mapping the faulty lane to a redundant lane, in accordance with the present disclosure.

FIG. 13 is a flowchart of an example process 1300 associated with detecting a faulty lane and mapping the faulty lane to a redundant lane, in accordance with the present disclosure. In some implementations, one or more process blocks of FIG. 13 are performed by a device (e.g., device 402). Additionally, or alternatively, one or more process blocks of FIG. 13 may be performed by one or more components of device 1100, such as processor 1110, memory 1112, input component 1120, output component 1130, and/or communication component 1135.

As shown in FIG. 13, process 1300 may include detecting, using a multi-module logic of a device, a faulty lane for data in a first module, of a plurality of modules of the device (block 1310). For example, the device may detect, using a multi-module logic of a device, a faulty lane for data in a first module, of a plurality of modules of the device, as described above.

As further shown in FIG. 13, process 1300 may include mapping, using the multi-module logic, the faulty lane for data to a redundant lane associated with the first module or a redundant lane associated with a second module of the plurality of modules (block 1320). For example, the device may map, using the multi-module logic, the faulty lane for data to a redundant lane associated with the first module or a redundant lane associated with a second module of the plurality of modules, as described above.

Process 1300 may include additional implementations, such as any single implementation or any combination of implementations described below and/or in connection with one or more other processes described elsewhere herein.

In a first implementation, the faulty lane for data is mapped to the redundant lane associated with the first module based at least in part on an intra-module repair; or the faulty lane for data is mapped to the redundant lane associated with the second module based at least in part on an inter-module repair.

In a second implementation, alone or in combination with the first implementation, the faulty lane for data is a first faulty lane for data, and mapping the first faulty lane for data is based at least in part on a left shift.

In a third implementation, alone or in combination with one or more of the first and second implementations, process 1300 includes mapping a second faulty lane for data based at least in part on a right shift, wherein the mapping of the second faulty lane is based on a skipping of a third faulty lane for data, and wherein the second faulty lane and the third faulty lane are mapped to redundant lanes of one or more of the first module or the second module.

Although FIG. 13 shows example blocks of process 1300, in some implementations, process 1300 includes additional blocks, fewer blocks, different blocks, or differently arranged blocks than those depicted in FIG. 13. Additionally, or alternatively, two or more of the blocks of process 1300 may be performed in parallel.

The following provides an overview of some Aspects of the present disclosure:

Aspect 1: A device, comprising: a plurality of modules, wherein a first module of the plurality of modules includes a plurality of lanes for data and a plurality of redundant lanes; and multi-module logic configured to: detect that a number of faulty lanes for data in the first module, of the plurality of lanes for data, satisfies a threshold; determine that one or more unused redundant lanes, in one or more of the first module or other modules of the plurality of modules, are available; and configure the one or more unused redundant lanes to be used as redundant lanes for the first module, wherein the one or more unused redundant lanes are configured to be shared between modules of the plurality of modules.

Aspect 2: The device of Aspect 1, wherein the multi-module logic is configured to: configure a register that indicates that unused redundant lanes of the other modules are useable to repair faulty lanes across different modules, wherein the one or more unused redundant lanes are configured based at least in part on the register.

Aspect 3: The device of any of Aspects 1-2, wherein the multi-module logic is configured to: configure a register that indicates functional redundant lanes for each module of the plurality of modules, wherein the one or more unused redundant lanes are configured based at least in part on the register.

Aspect 4: The device of any of Aspects 1-3, wherein the multi-module logic is configured to: identify the one or more unused redundant lanes, in one or more of the first module or the other modules of the plurality of modules, based at least in part on a global view of redundant lanes across the plurality of modules.

Aspect 5: The device of any of Aspects 1-4, wherein the multi-module logic is configured to: configure the one or more unused redundant lanes to be used as the redundant lanes for the first module based at least in part on a mapping, wherein the mapping maps each faulty lane to an appropriate redundant lane in the first module or in one of the other modules, and wherein the mapping is based at least in part on a left shift operation or a right shift operation that bypasses faulty lanes.

Aspect 6: The device of any of Aspects 1-5, wherein the plurality of modules includes the first module and a second module, wherein the first module includes a first intra-module multiplexer associated with a first die and a second intra-module multiplexer associated with a second die, wherein the first intra-module multiplexer and the second intra-module multiplexer allow for communication between the first die and the second die, and wherein an inter-module multiplexer between the first module and the second module allows for communication between the first module and the second module.

Aspect 7: The device of Aspect 6, wherein the communication between the first die and the second die and the communication between the first module and the second module involve sharing information regarding redundant lanes across the plurality of modules.

Aspect 8: The device of any of Aspects 1-7, wherein the plurality of modules are in accordance with a universal chiplet interconnect express (UCIe) specification.

Aspect 9: A method, comprising: detecting, using a multi-module logic of a device, that a number of faulty lanes for data in a first module, of a plurality of modules of the device, satisfies a threshold; determining, using the multi-module logic, that one or more unused redundant lanes, in one or more of the first module or other modules of the plurality of modules, are available; and configuring, using the multi-module logic, the one or more unused redundant lanes to be used as redundant lanes for the first module, wherein the one or more unused redundant lanes are configured to be shared between modules of the plurality of modules.

Aspect 10: The method of Aspect 9, further comprising: configuring, using the multi-module logic, a register that indicates that unused redundant lanes of the other modules are useable to repair faulty lanes across different modules, wherein the one or more unused redundant lanes are configured based at least in part on the register.

Aspect 11: The method of any of Aspects 9-10, further comprising: configuring, using the multi-module logic, a register that indicates functional redundant lanes for each module of the plurality of modules, wherein the one or more unused redundant lanes are configured based at least in part on the register.

Aspect 12: The method of any of Aspects 9-11, further comprising: identifying the one or more unused redundant lanes, in one or more of the first module or the other modules of the plurality of modules, based at least in part on a global view of redundant lanes across the plurality of modules.

Aspect 13: The method of any of Aspects 9-12, further comprising: configuring the one or more unused redundant lanes to be used as the redundant lanes for the first module based at least in part on a mapping, wherein the mapping maps each faulty lane to an appropriate redundant lane in the first module or in one of the other modules, and wherein the mapping is based at least in part on a left shift operation or a right shift operation that bypasses faulty lanes.

Aspect 14: The method of any of Aspects 9-13, wherein the first module is a first module, wherein the plurality of modules includes the first module and a second module, wherein the first module includes a first intra-module multiplexer associated with a first die and a second intra-module multiplexer associated with a second die, wherein the first intra-module multiplexer and the second intra-module multiplexer allow for communication between the first die and the second die, and wherein an inter-module multiplexer between the first module and the second module allows for communication between the first module and the second module.

Aspect 15: The method of Aspect 14, wherein the communication between the first die and the second die and the communication between the first module and the second module involve sharing information regarding redundant lanes across the plurality of modules.

Aspect 16: The method of any of Aspects 9-15, wherein the plurality of modules are in accordance with a universal chiplet interconnect express (UCIe) specification.

Aspect 17: A non-transitory computer-readable medium storing a set of instructions, the set of instructions comprising: one or more instructions that, when executed by one or more components of a device, cause the device to: detect, using a multi-module logic of the device, that a number of faulty lanes for data in a module, of a plurality of modules of the device, satisfies a threshold; determine, using the multi-module logic, that one or more unused redundant lanes, in one or more of the module or other modules of the plurality of modules, are available; and configure, using the multi-module logic, the one or more unused redundant lanes to be used as redundant lanes for the module, wherein the one or more unused redundant lanes are configured to be shared between modules of the plurality of modules.

Aspect 18: The non-transitory computer-readable medium of Aspect 17, wherein the one or more instructions, when executed by the one or more components of a device, further cause the device to: configure, using the multi-module logic, a first register that indicates that unused redundant lanes of the other modules are useable to repair faulty lanes across different modules, wherein the one or more unused redundant lanes are configured based at least in part on the first register; and configure, using the multi-module logic, a second register that indicates functional redundant lanes for each module of the plurality of modules, wherein the one or more unused redundant lanes are configured based at least in part on the second register.

Aspect 19: The non-transitory computer-readable medium of any of Aspects 17-18, wherein the one or more instructions, when executed by the one or more components of a device, further cause the device to: identify the one or more unused redundant lanes, in one or more of the module or the other modules of the plurality of modules, based at least in part on a global view of redundant lanes across the plurality of modules.

Aspect 20: The non-transitory computer-readable medium of any of Aspects 17-19, wherein the one or more instructions, when executed by the one or more components of a device, further cause the device to: configure the one or more unused redundant lanes to be used as the redundant lanes for the module based at least in part on a mapping, wherein the mapping maps each faulty lane to an appropriate redundant lane in the module or in one of the other modules, and wherein the mapping is based at least in part on a left shift operation or a right shift operation that bypasses faulty lanes.

Aspect 21: A method, comprising: detecting, using a multi-module logic of a device, a faulty lane for data in a first module, of a plurality of modules of the device; and mapping, using the multi-module logic, the faulty lane for data to a redundant lane associated with the first module or a redundant lane associated with a second module of the plurality of modules.

Aspect 22: The method of Aspect 21, wherein: the faulty lane for data is mapped to the redundant lane associated with the first module based at least in part on an intra-module repair; or the faulty lane for data is mapped to the redundant lane associated with the second module based at least in part on an inter-module repair.

Aspect 23: The method of any of Aspects 21-22, wherein the faulty lane for data is a first faulty lane for data, and mapping the first faulty lane for data is based at least in part on a left shift.

Aspect 24: The method of Aspect 14, further comprising: mapping a second faulty lane for data based at least in part on a right shift, wherein the mapping of the second faulty lane is based on a skipping of a third faulty lane for data, and wherein the second faulty lane and the third faulty lane are mapped to redundant lanes of one or more of the first module or the second module.

Aspect 25: A system configured to perform one or more operations recited in one or more of Aspects 1-24.

Aspect 26: An apparatus comprising means for performing one or more operations recited in one or more of Aspects 1-24.

Aspect 27: A non-transitory computer-readable medium storing a set of instructions, the set of instructions comprising one or more instructions that, when executed by a device, cause the device to perform one or more operations recited in one or more of Aspects 1-24.

Aspect 28: A computer program product comprising instructions or code for executing one or more operations recited in one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:

a plurality of modules, wherein a first module of the plurality of modules includes a plurality of lanes for data and a plurality of redundant lanes, wherein the plurality of modules includes the first module and a second module, wherein the first module includes a first intra-module multiplexer associated with a first die and a second intra-module multiplexer associated with a second die, wherein the first intra-module multiplexer and the second intra-module multiplexer allow for communication between the first die and the second die, and wherein an inter-module multiplexer between the first module and the second module allows for communication between the first module and the second module; and multi-module physical (PHY) logic configured to:

detect that a number of faulty lanes for data in the first module, of the plurality of lanes for data, satisfies a threshold;

determine that one or more unused redundant lanes, in one or more of the first module or other modules of the plurality of modules, are available; and configure the one or more unused redundant lanes to be used as redundant lanes for the first module, wherein the one or more unused redundant lanes are configured to be shared between modules of the plurality of modules.

2. The device of claim 1, wherein the multi-module PHY logic is configured to:

configure a register that indicates that unused redundant lanes of the other modules are useable to repair faulty lanes across different modules, wherein the one or more unused redundant lanes are configured based at least in part on the register.

3. The device of claim 1, wherein the multi-module PHY logic is configured to:

configure a register that indicates functional redundant lanes for each module of the plurality of modules, wherein the one or more unused redundant lanes are configured based at least in part on the register.

4. The device of claim 1, wherein the multi-module PHY logic is configured to:

identify the one or more unused redundant lanes, in one or more of the first module or the other modules of the plurality of modules, based at least in part on a global view of redundant lanes across the plurality of modules.

5. The device of claim 1, wherein the multi-module PHY logic is configured to:

configure the one or more unused redundant lanes to be used as the redundant lanes for the first module based at least in part on a mapping, wherein the mapping maps each faulty lane to an appropriate redundant lane in the first module or in one of the other modules, and wherein the mapping is based at least in part on a left shift operation or a right shift operation that bypasses faulty lanes.

6. The device of claim 1, wherein the communication between the first die and the second die and the communication between the first module and the second module involve sharing information regarding redundant lanes across the plurality of modules.

7. The device of claim 1, wherein the plurality of modules are in accordance with a universal chiplet interconnect express (UCIe) specification.

8. A method, comprising:

detecting, using a multi-module physical (PHY) logic of a device, that a number of faulty lanes for data in a first module, of a plurality of modules of the device, satisfies a threshold, wherein the plurality of modules includes the first module and a second module, wherein the first module includes a first intra-module multiplexer associated with a first die and a second intra-module multiplexer associated with a second die, wherein the first intra-module multiplexer and the second intra-module multiplexer allow for communication between the first die and the second die, and wherein an inter-module multiplexer between the first module and the second module allows for communication between the first module and the second module;

determining, using the multi-module PHY logic, that one or more unused redundant lanes, in one or more of the first module or other modules of the plurality of modules, are available; and configuring, using the multi-module PHY logic, the one or more unused redundant lanes to be used as redundant lanes for the first module, wherein the one or more unused redundant lanes are configured to be shared between modules of the plurality of modules.

9. The method of claim 8, further comprising:

configuring, using the multi-module PHY logic, a register that indicates that unused redundant lanes of the other modules are useable to repair faulty lanes across different modules, wherein the one or more unused redundant lanes are configured based at least in part on the register.

10. The method of claim 8, further comprising:

configuring, using the multi-module PHY logic, a register that indicates functional redundant lanes for each module of the plurality of modules, wherein the one or more unused redundant lanes are configured based at least in part on the register.

11. The method of claim 8, further comprising:

identifying the one or more unused redundant lanes, in one or more of the first module or the other modules of the plurality of modules, based at least in part on a global view of redundant lanes across the plurality of modules.

12. The method of claim 8, further comprising:

configuring the one or more unused redundant lanes to be used as the redundant lanes for the first module based at least in part on a mapping, wherein the mapping maps each faulty lane to an appropriate redundant lane in the first module or in one of the other modules, and wherein the mapping is based at least in part on a left shift operation or a right shift operation that bypasses faulty lanes.

13. The method of claim 8, wherein the communication between the first die and the second die and the communication between the first module and the second module involve sharing information regarding redundant lanes across the plurality of modules.

14. The method of claim 8, wherein the plurality of modules are in accordance with a universal chiplet interconnect express (UCIe) specification.

15. A method, comprising:

detecting, using a multi-module physical (PHY) logic of a device, a faulty lane for data in a first module, of a plurality of modules of the device, wherein the plurality of modules includes the first module and a second module, wherein the first module includes a first intra-module multiplexer associated with a first die and a second intra-module multiplexer associated with a second die, wherein the first intra-module multiplexer and the second intra-module multiplexer allow for communication between the first die and the second die, and wherein an inter-module multiplexer between the first module and the second module allows for communication between the first module and the second module; and mapping, using the multi-module PHY logic, the faulty lane for data to a redundant lane associated with the first module or a redundant lane associated with the second module of the plurality of modules.

16. The method of claim 15, wherein:

the faulty lane for data is mapped to the redundant lane associated with the first module based at least in part on an intra-module repair; or the faulty lane for data is mapped to the redundant lane associated with the second module based at least in part on an inter-module repair.

17. The method of claim 15, wherein the faulty lane for data is a first faulty lane for data, and mapping the first faulty lane for data is based at least in part on a left shift.

18. The method of claim 17, further comprising:

mapping a second faulty lane for data based at least in part on a right shift, wherein the mapping of the second faulty lane is based on a skipping of a third faulty lane for data, and wherein the second faulty lane and the third faulty lane are mapped to redundant lanes of one or more of the first module or the second module.

19. The method of claim 15, wherein the communication between the first die and the second die and the communication between the first module and the second module involve sharing information regarding redundant lanes across the plurality of modules.

20. The method of claim 15, wherein the plurality of modules are in accordance with a universal chiplet interconnect express (UCIe) specification.

* * * * *